(12) United States Patent
Toritani

(10) Patent No.: US 12,240,128 B2
(45) Date of Patent: Mar. 4, 2025

(54) INTEGRATED NAVIGATION SYSTEM AND WORK INSTRUCTION METHOD

(71) Applicant: Panasonic Intellectual Property Management Co., Ltd., Osaka (JP)

(72) Inventor: Kenichiro Toritani, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 589 days.

(21) Appl. No.: 17/605,739

(22) PCT Filed: Apr. 24, 2019

(86) PCT No.: PCT/JP2019/017522
§ 371 (c)(1),
(2) Date: Oct. 22, 2021

(87) PCT Pub. No.: WO2020/217365
PCT Pub. Date: Oct. 29, 2020

(65) Prior Publication Data
US 2022/0212346 A1    Jul. 7, 2022

(51) Int. Cl.
*B25J 9/16*     (2006.01)
(52) U.S. Cl.
CPC ........... *B25J 9/1682* (2013.01); *B25J 9/1653* (2013.01); *B25J 9/1661* (2013.01); *G05B 2219/39117* (2013.01)
(58) Field of Classification Search
CPC ...... B25J 9/1682; B25J 9/1653; B25J 9/1661; G05B 2219/39117
See application file for complete search history.

(56) References Cited

U.S. PATENT DOCUMENTS

| 5,321,619 A | 6/1994 | Matsuda et al. |
| 5,825,981 A | 10/1998 | Matsuda |
| 9,465,390 B2 | 10/2016 | Mason et al. |
| 9,682,481 B2 | 6/2017 | Lutz et al. |
| 9,707,680 B1 * | 7/2017 | Jules ............... B25J 9/1661 |
| 10,894,664 B1 * | 1/2021 | Brady ............... B65G 1/1378 |

(Continued)

FOREIGN PATENT DOCUMENTS

| CN | 101414170 A | 4/2009 |
| CN | 102460329 A | 5/2012 |

(Continued)

OTHER PUBLICATIONS

International Search Report dated Jul. 16, 2019 issued in Patent Application No. PCT/JP2019/017522.

(Continued)

*Primary Examiner* — Sohana Tanju Khayer
(74) *Attorney, Agent, or Firm* — McDonald Hopkins LLC

(57) ABSTRACT

An integrated navigation system is configured to support cooperation of a plurality of different robot systems each including at least one automatic work robot operating at a production site. The integrated navigation system includes a job generation device configured to generate a job related to production based on information sent from a plurality of production facilities deployed at the production site, and a navigation device configured to generate a task, which is a work command to each of the plurality of different robot systems, based on the job, and to send the task of the robot system to each corresponding robot system.

22 Claims, 16 Drawing Sheets

(56) References Cited

U.S. PATENT DOCUMENTS

| | | | |
|---|---|---|---|
| 11,400,823 B1* | 8/2022 | Sampath | B60L 58/12 |
| 2001/0047578 A1 | 12/2001 | Maruyama et al. | |
| 2004/0133310 A1 | 7/2004 | Watanabe et al. | |
| 2010/0312387 A1 | 12/2010 | Jang et al. | |
| 2010/0312388 A1 | 12/2010 | Jang et al. | |
| 2014/0088748 A1 | 3/2014 | Woodtli et al. | |
| 2014/0365258 A1* | 12/2014 | Vestal | G16H 40/20 901/1 |
| 2016/0132059 A1 | 5/2016 | Mason et al. | |
| 2016/0229631 A1 | 8/2016 | Kimura et al. | |
| 2016/0361815 A1* | 12/2016 | Matsunami | B25J 9/1689 |
| 2017/0017443 A1* | 1/2017 | Sato | H04N 1/00915 |
| 2017/0255533 A1* | 9/2017 | Coglitore | G11B 17/08 |
| 2018/0046963 A1* | 2/2018 | Kobayashi | G06Q 10/06 |
| 2018/0275679 A1* | 9/2018 | Baughman | B25J 9/1661 |

FOREIGN PATENT DOCUMENTS

| | | |
|---|---|---|
| CN | 104555222 A | 4/2015 |
| CN | 107003662 A | 8/2017 |
| EP | 0 192 338 A1 | 8/1986 |
| EP | 1 795 983 A1 | 6/2007 |
| JP | S53-108050 A | 9/1978 |
| JP | S61-204060 A | 9/1986 |
| JP | H04-159061 A | 6/1992 |
| JP | H09-244730 A | 9/1997 |
| JP | H09-244790 A | 9/1997 |
| JP | 2001-277055 A | 10/2001 |
| JP | 2004-185228 A | 7/2004 |
| WO | 2015-097736 A1 | 7/2015 |

OTHER PUBLICATIONS

Written Opinion dated Jul. 16, 2019 issued in Patent Application No. PCT/JP2019/017522.

Japanese Office Action dated Aug. 1, 2023 issued in Japanese Patent Application No. 2021-515395.

Chinese Office Action issued in Chinese Patent Application No. 201980095715.0 dated Apr. 2, 2024.

* cited by examiner

FIG. 3

[FIRST SCENARIO]

COMPONENT CONVEYANCE REQUEST JOB OCCURS
FROM OUT-OF-STOCK PREDICTION UNIT 23

COMPONENT CONVEYANCE REQUEST JOB (ID100)
"CONVEY ELECTRONIC COMPONENT W2a TO COMPONENT SUPPLY UNIT 14A
OF COMPONENT MOUNTING DEVICE 14 BY TIME T1."

TASK FOR AUTOMATIC WAREHOUSES 33A

ID100-10 "CONVEY ELECTRONIC COMPONENT W2a TO
COMPONENT INLET/OUTLET 32Ca."

TASK FOR CONVEYANCE ROBOTS 31A

ID100-30 "MOVE TO COMPONENT RECEIVING POSITION P1a."
ID100-31 "WAIT AT COMPONENT RECEIVING POSITION P1a."
ID100-32 "MOVE TO STOP POSITION P2 AFTER ID100-52 IS ENDED."

TASK FOR PICKING ROBOTS 32A

ID100-50 "MOVE TO WORK POSITION P3a."
ID100-51 "WAIT AT WORK POSITION P3a."
ID100-52 "CONVEY ELECTRONIC COMPONENT W2a OF COMPONENT INLET/OUTLET
32Ca TO COMPONENT RECEIVING POSITION P1a WHEN ID100-10 AND
ID100-31 ARE ENDED."

FIG. 8

| | BEFORE PROCESSING | AFTER PROCESSING |
|---|---|---|
| AUTOMATIC WAREHOUSES 33A | ID100-10<br>CONVEY ELECTRONIC COMPONENT W2a TO COMPONENT INLET/OUTLET 32Ca | ID100-10<br>CONVEY ELECTRONIC COMPONENT W2a TO COMPONENT INLET/OUTLET 32Ca |
| AUTOMATIC WAREHOUSES 33A | ID200-10<br>CONVEY ELECTRONIC COMPONENT W2b TO COMPONENT INLET/OUTLET 32Cb | ID200-10<br>CONVEY ELECTRONIC COMPONENT W2b TO COMPONENT INLET/OUTLET 32Cb |
| CONVEYANCE ROBOTS 31A | ID100-30<br>  MOVE TO COMPONENT RECEIVING POSITION P1a<br>ID100-31<br>  WAIT AT COMPONENT RECEIVING POSITION P1a<br>ID100-32<br>  MOVE TO STOP POSITION P2 AFTER ID100-52 IS ENDED<br><br>ID200-30<br>  MOVE TO COMPONENT RECEIVING POSITION P1b<br>ID200-31<br>  WAIT AT COMPONENT RECEIVING POSITION P1b<br>ID200-32<br>  MOVE TO STOP POSITION P2 AFTER ID200-52 IS ENDED | ID200-30<br>  MOVE TO COMPONENT RECEIVING POSITION P1b<br>ID200-31<br>  WAIT AT COMPONENT RECEIVING POSITION P1b<br>ID200-34<br>  MOVE TO COMPONENT RECEIVING POSITION P1a WHEN ID200-52 IS ENDED<br>ID100-31<br>  WAIT AT COMPONENT RECEIVING POSITION P1a<br>ID100-32<br>  MOVE TO STOP POSITION P2 AFTER ID100-52 IS ENDED<br><br>TASK INTEGRATION |
| PICKING ROBOTS 32A | ID100-50<br>  MOVE TO WORK POSITION P3a<br>ID100-51<br>  WAIT AT WORK POSITION P3a<br>ID100-52<br>  CONVEY ELECTRONIC COMPONENT W2a OF COMPONENT INLET/OUTLET 32Ca TO COMPONENT RECEIVING POSITION P1a WHEN ID100-10 AND ID100-31 ARE ENDED<br><br>ID200-50<br>  MOVE TO WORK POSITION P3b<br>ID200-51<br>  WAIT AT WORK POSITION P3b<br>ID200-52<br>  CONVEY ELECTRONIC COMPONENT W2b OF COMPONENT INLET/OUTLET 32Cb TO COMPONENT RECEIVING POSITION P1b WHEN ID200-10 AND ID200-31 ARE ENDED | ID200-50<br>  MOVE TO WORK POSITION P3b<br>ID200-51<br>  WAIT AT WORK POSITION P3b<br>ID200-52<br>  CONVEY ELECTRONIC COMPONENT W2b OF COMPONENT INLET/OUTLET 32Cb TO COMPONENT RECEIVING POSITION P1b WHEN ID200-10 AND ID200-31 ARE ENDED<br><br>TASK ORDER CHANGE INTEGRATION<br><br>ID100-50<br>  MOVE TO WORK POSITION P3a<br>ID100-51<br>  WAIT AT WORK POSITION P3a<br>ID100-52<br>  CONVEY ELECTRONIC COMPONENT W2a OF COMPONENT INLET/OUTLET 32Ca to COMPONENT RECEIVING POSITION P1a WHEN ID100-10 AND ID100-31 ARE ENDED<br><br>TASK ORDER CHANGE INTEGRATION |

FIG. 10

[THIRD SCENARIO]

ASSUME A CASE WHERE COMPONENT CONVEYANCE REQUEST JOBS (ID100, ID200) IN SECOND SCENARIO ARE SET AND THEN JOB ID100 IS CANCELLED DUE TO DELAY OF CONVEYANCE ROBOTS 31A.
JOB ID100 IS EXECUTED BY WORKER H INSTEAD.
A PART OF JOB HAS BEEN ALREADY EXECUTED.

1. CANCELLATION OF JOB ID100 OCCURS
COMPONENT CONVEYANCE REQUEST JOB (ID100)
"CONVEY ELECTRONIC COMPONENT W2A TO COMPONENT SUPPLY UNIT 14A OF COMPONENT MOUNTING DEVICE 14 BY TIME T1."

TASK FOR AUTOMATIC WAREHOUSES 33A)
IDR100-10 EXECUTE RECOVERY TASK

TASK FOR CONVEYANCE ROBOTS 31A
ID200-30 "MOVE TO COMPONENT RECEIVING POSITION P1b."
ID200-31 "WAIT AT COMPONENT RECEIVING POSITION P1b."
ID200-35 "MOVE TO STOP POSITION P2 AFTER ID200-52 IS ENDED."

TASK FOR PICKING ROBOTS 32A
ID200-50 "MOVE TO WORK POSITION P3b."
ID200-51 "WAIT AT WORK POSITION P3b."
ID200-52 "CONVEY ELECTRONIC COMPONENT W2b OF COMPONENT INLET/OUTLET 32Cb TO COMPONENT RECEIVING POSITION P1b WHEN ID200-10 AND ID200-31 ARE ENDED."

FIG. 11

| | BEFORE PROCESSING | AFTER PROCESSING |
|---|---|---|
| AUTOMATIC WAREHOUSES 33A | ID100-10<br>  CONVEY ELECTRONIC<br>  COMPONENT W2a TO<br>  COMPONENT INLET/OUTLET 32Ca | IDR100-10<br>  "EXECUTE RECOVERY TASK."<br>  FOR EXAMPLE:<br>  -ACCOMMODATE ELECTRONIC<br>   COMPONENT OF COMPONENT<br>   INLET/OUTLET 32Ca<br>  -INSTRUCT WORKER TO REMOVE<br>   ELECTRONIC COMPONENT OF<br>   COMPONENT INLET/OUTLET 32Ca |
| AUTOMATIC WAREHOUSES 33A | ID200-10<br>  CONVEY ELECTRONIC<br>  COMPONENT W2b TO<br>  COMPONENT INLET/OUTLET 32Cb | (EXECUTED TASK IS IGNORED) |
| CONVEYANCE ROBOTS 31A | ID200-30<br>  MOVE TO COMPONENT RECEIVING<br>  POSITION P1b<br>ID200-31<br>  WAIT AT COMPONENT RECEIVING<br>  POSITION P1b<br>ID100-34<br>  MOVE TO COMPONENT RECEIVING<br>  POSITION P1a WHEN ID200-52 IS<br>  ENDED<br>ID100-31<br>  WAIT AT COMPONENT RECEIVING<br>  POSITION P1a<br>ID100-32<br>  MOVE TO STOP POSITION P2<br>  AFTER ID100-52 IS ENDED | (NOTIFY CONVEYANCE ROBOTS 31A OF NEWLY GENERATED TASK)<br><br>ID200-30<br>  MOVE TO COMPONENT RECEIVING<br>  POSITION P1b<br>ID200-31<br>  WAIT AT COMPONENT RECEIVING<br>  POSITION P1b<br>ID200-35<br>  MOVE TO STOP POSITION P2 AFTER<br>  ID100-52 IS ENDED |
| PICKING ROBOTS 32A | ID200-50<br>  MOVE TO WORK POSITION P3b<br>ID200-51<br>  WAIT AT WORK POSITION P3b<br>ID200-52<br>  CONVEY ELECTRONIC COMPONENT<br>  W2b OF COMPONENT INLET/OUTLET<br>  32Cb TO COMPONENT RECEIVING<br>  POSITION P1b WHEN ID200-10 AND<br>  ID200-31 ARE ENDED<br>ID100-50<br>  MOVE TO WORK POSITION P3a<br>ID100-51<br>  WAIT AT WORK POSITION P3a<br>ID100-52<br>  CONVEY ELECTRONIC COMPONENT<br>  W2a OF COMPONENT INLET/OUTLET<br>  32Ca TO COMPONENT RECEIVING<br>  POSITION P1a WHEN ID100-10 AND<br>  ID100-31 ARE ENDED | ID200-50<br>  MOVE TO WORK POSITION P3b<br>ID200-51<br>  WAIT AT WORK POSITION P3b<br>ID200-52<br>  CONVEY ELECTRONIC COMPONENT<br>  W2b OF COMPONENT INLET/OUTLET<br>  32Cb TO COMPONENT RECEIVING<br>  POSITION P1b WHEN ID200-10 AND<br>  ID200-31 ARE ENDED<br><br>(DELETE TASKS NOT INCLUDED IN REGENERATED TASKS<br>→NOTIFY PICKING ROBOTS<br>  OF DELETION) |

INTEGRATED NAVIGATION SYSTEM AND WORK INSTRUCTION METHOD

TECHNICAL FIELD

The present disclosure relates to an integrated navigation system and a work instruction method.

BACKGROUND ART

In related art, in a production site such as a factory, automated to conveyance of members and the like used for production using an automated guided vehicle (AGV) has been performed to achieve automation or manpower reduction in the production site (see Patent Literature 1 and the like).

For example, Patent Literature 1 discloses a picking system including: a moving shelf that is movable; an automated guided vehicle that conveys the moving shelf; an AGV area in which the automated guided vehicle conveys the moving shelf; a picking area that is adjacent to the AGV area and in which a worker performs a picking operation; two or more picking locations at which the moving shelf is temporarily installed at positions adjacent to one picking area in the AGV area; a control system; and a picking terminal. The control system is connected to the automated guided vehicle and the picking terminal. When the control system receives, from the automated guided vehicle, a notification that the moving shelf to be picked is installed at any picking location, the control system notifies the picking terminal that picking is enabled. This notification improves the efficiency of distribution.

CITATION LIST

Patent Literature

Patent Literature 1: WO2015/097736

SUMMARY OF INVENTION

Technical Problem

Incidentally, with regard to the operation of automation or manpower reduction in a production site or the related art, in recent years, further promotion of smartification has been expected. For this purpose, for example, it is required to cause robot systems provided by a plurality of different vendors (manufacturers) (for example, robot systems for managing operation of the automated guided vehicle (AGV) described above) closely cooperate with each other, and a more sophisticated automation system can be constructed due to such cooperation.

However, regarding this purpose, various problems still remain. For example, even using the configuration of Patent Literature 1 described above, it is difficult to construct an automation system having high versatility and expandability in a production site. As a specific example, it is difficult to, in addition to a currently operated robot system, add a robot system provided by another vendor afterward, or to change some of the functions of the current robot system.

It is an object of the present disclosure to provide an integrated navigation system and a work instruction method that effectively support sophisticated cooperation of operations between robot system industries provided by a plurality of different vendors in a production site such as a factory and improve versatility and expandability as a system.

Solution to Problem

The present disclosure provides an integrated navigation system configured to support cooperation of a plurality of different robot systems each including at least one automatic work robot operating at a production site. The integrated navigation system includes: a job generation device configured to generate a job related to production based on information sent from a plurality of production facilities deployed at the production site; and a navigation device configured to generate a task, which is a work command to each of the plurality of different robot systems, based on the job, and to send the task of the robot system to each corresponding robot system.

In addition, the present disclosure provides a work instruction method for supporting cooperation of a plurality of different robot systems each including at least one automatic work robot operating at a production site. The work instruction method includes: a job generation step of generating a job related to production based on information sent from a plurality of production facilities deployed at the production site; and a work instruction step of generating a task, which is a work command to each of the plurality of different robot systems, based on the job, and sending the task of the robot system to each corresponding robot system.

Advantageous Effects of Invention

According to the present disclosure, it is possible to effectively support sophisticated cooperation of operations between robot systems provided by a plurality of different vendors in a production site such as a factory and to improve versatility and expandability as a system.

BRIEF DESCRIPTION OF DRAWINGS

FIG. 3 is a table exemplifying contents of a job and tasks when a component conveyance request job occurs.

FIG. 8 is a table exemplifying a state in which the two component conveyance request jobs are subjected to an optimization process based on an order thereof.

FIG. 10 is a table exemplifying contents of jobs and tasks when at least one of the two component conveyance request jobs is cancelled.

FIG. 11 is a table illustrating a state in which a cancellation process is performed when one of the two component conveyance request jobs is cancelled.

DESCRIPTION OF EMBODIMENTS

Hereinafter, an embodiment specifically disclosing an integrated navigation system and a work instruction method according to the present disclosure will be described in detail with reference to the drawings as appropriate. However, unnecessarily detailed description may be omitted. For example, a detailed description of a well-known matter or a repeated description of substantially the same configuration may be omitted. This is to avoid unnecessary redundancy in the following description and to facilitate understanding for those skilled in the art. It should be noted that the accompanying drawings and the following description are provided for a thorough understanding of the present disclosure by those skilled in the art, and are not intended to limit the subject matter recited in the claims.

For example, the embodiment describes a production site including a mounting board production line (see below) as an example of a production site, but is not limited thereto. The production site is not limited to this type of production site or member as long as being a production site in which a production facility that consumes members (including components) in a producing process of the mounting board is installed, and may be, for example, a manufacturing factory in which an assembly device for assembling members by welding is deployed.

In addition, a "unit" or a "device" in the embodiment is not only limited to a physical configuration realized by hardware, but also includes a situation in which a function of the configuration is realized by software such as a program. In addition, a function of one configuration may be realized by two or more physical configurations, or functions of two or more configurations may be realized by one physical configuration, for example.

<Outline of Layout of Production Site>

Figure 1:
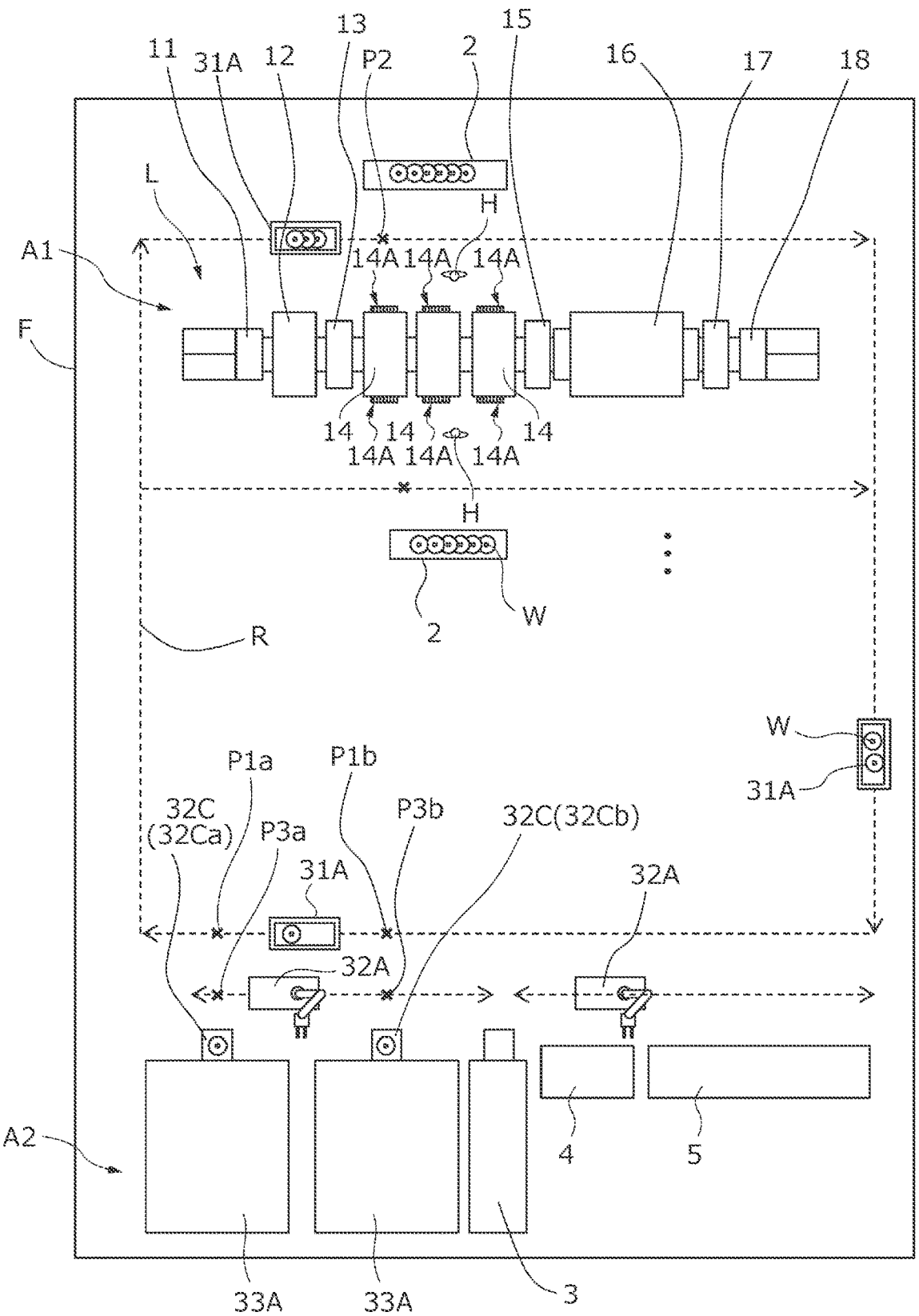
FIG. 1 is a layout diagram illustrating an arrangement relationship of a production site according to the present embodiment.

First, an outline of a layout in a production site F according to the present embodiment will be described with reference to FIG. 1. FIG. 1 is a layout diagram illustrating an arrangement relationship of the production site F according to the present embodiment.

As shown in FIG. 1, the production site F includes a mounting board production line L to be described below, and four sides of the production site F are partitioned by predetermined walls. In the production site F, a plurality of production facilities (see below) constituting the mounting board production line L and a plurality of robot systems 31, 32, 33 are arranged. Each robot system includes at least one automatic work robot and a management device for managing operation of the automatic work robot. For example, the automatic work robot performs support of a work of supplement of a member consumed in a production facility to the production facility (for example, a work of conveying the member to the vicinity of the production facility) or supplement (for example, supplement to the production facility in place of a worker). Accordingly, in the production facilities as described below, conveyance robots 31A (for example, an automated guided vehicle (AGV)) and picking robots 32A as an example of the automatic work robot are used, and component storages stocked in automatic warehouses 33A constituting the robot system 33 are automatically conveyed to the corresponding production facility. Here, the component storages store, for example, electronic components, and include a carrier tape in which a component is sealed, and a reel, a tray, a stick, or the like obtained by winding a carrier tape. In the present embodiment, a reel is exemplified as the component storage.

In the production site F, at least a production area A1 and a warehouse area A2 for accommodating and storing electronic components and the like are arranged. The production area A1 is, for example, arranged on one side in the production site F so as to occupy a certain range. The production area A1 of the present embodiment is an area for producing a mounting board in which electronic components are soldered to a board. The warehouse area A2 is disposed apart from the production area A1, and is, for example, arranged on the other side of the production site F so as to occupy a certain range similarly. A conveyance route R along which the conveyance robots 31A travel is disposed in the production area A1 and the warehouse area A2. Each conveyance robot 31A travels along the conveyance route R to convey the component storages or the like of the electronic components from the warehouse area A2 to the production area A1. The conveyance route R is defined by physical objects such as a sign or an induction line provided in the production site F, or route information or map information stored in a conveyance robot management device 31B (see FIG. 2).

In the production site F, a stock shelf 2 for temporarily placing and storing the component storages is disposed. The stock shelf 2 is disposed in the vicinity of the mounting board production line L, and is laid out such that a movement line of a worker H moving back and forth between the stock shelf 2 and the mounting board production line L is short.

In FIG. 1, for convenience of explanation, the conveyance route R is represented by a simple linear shape or rectangular shape, but is not limited thereto. The conveyance route R is provided in various ways (for example, in a zigzag shape, an oblique direction, or the like) as necessary. The same applies to the production area A1 and the warehouse area A2, which may have any positions, occupied areas, and the like, and are appropriately designed according to specifications of the production site F. In addition, the work mentioned in the present embodiment is used to refer to not only a treatment such as some kind of machining on a predetermined object (workpiece) but also an operation itself of a subject that executes the work.

The conveyance robots 31A constitute the robot system 31, and each include a main body and a plurality of wheels attached to the main body. The conveyance robot 31A automatically travels, for example, by reading a magnetic tape provided on the conveyance route R with a predetermined magnetic sensor. In addition, an upper surface portion of the main body of the conveyance robot 31A can have a component storage that stores members and the like placed thereon. Accordingly, the conveyance robot 31A conveys a component storage storing various members to a required production facility in a state where the component storage is placed on an upper end surface thereof. The conveyance robots 31A are subjected to centralized management and operation control by the conveyance robot management device 31B (see FIG. 2) in an integrated manner. An induction method of the conveyance robot 31A is not limited to a method using magnetism (electromagnetic induction), and may appropriately adopt various other methods, for example, an electromagnetic method, a laser method, and the like.

The mounting board production line L is provided in production area A1. The mounting board production line L is configured with a plurality of production facilities. In the present embodiment, specifically, a board supply device 11, a screen printing device 12, a printing solder inspection device 13, a component mounting device 14, a component mounting state inspection device 15, a reflow device 16, a mounting board inspection device 17, and a mounting board collection device 18 are production facilities. The screen printing device 12, the printing solder inspection device 13, the component mounting device 14, the component mounting state inspection device 15, the reflow device 16, and the mounting board inspection device 17 each include a built-in conveyor that conveys the board, and are connected in an order of producing process. Each of these production facilities receives the board from the conveyor of a production facility of the upstream process, and convey the received board to the conveyor of a production facility of the next process when a predetermined operation is completed on the board. Therefore, the mounting board production line L automatically executes a series of producing processes such as solder printing on the board, mounting of electronic components on the board, and solder reflow.

The board supply device 11 is disposed at a start of the mounting board production line L, and sequentially supplies boards to the screen printing device 12. The screen printing device 12 performs screen printing of, for example, cream solder or the like on the supplied board at a predetermined position. The printing solder inspection device 13 inspects a position and a state of the solder printed on the board. The component mounting device 14 has a work head that holds and electronic components supplied from the component storage conveyed by the conveyance robot 31A and mounts the electronic components, for example, on the board, and mounts the electronic components by the work head at positions where the cream solder is printed by the screen printing device 12. In addition, the component mounting device 14 includes a component supply unit 14A for supplying the electronic components to the work head. A component storage W in which electronic components are accommodated is set in the component supply unit 14A, and the components of the component storage W are supplied to a position where the work head of the component mounting device 14 can hold the component. When the electronic components of the component supply unit 14A are consumed and are out of stock or the remaining number thereof is reduced, the component storage W is replaced with a new one by the worker H. As the component storage W, a tape reel of a tape containing electronic components or a tray containing electronic components is generally used. The component mounting state inspection device 15 inspects the position and the state of the electronic components mounted on the board. In the present embodiment, a plurality of component mounting devices 14 are provided in order to mount various electronic components on the board.

The reflow device 16 performs soldering on the board on which the electronic components are mounted. That is, the reflow device 16 is a so-called heating furnace, which heats and melts the solder of the board, and then cools and solidifies the solder to solder the electronic components to the board. The mounting board inspection device 17 inspects the mounting board that has been soldered by the reflow device 16. Specifically, a soldering state of the electronic components on the board is inspected. The mounting board collection device 18 collects the board to which the electronic components are soldered in this way, and brings the board into a state that can be conveyed to the outside of the mounting board production line L.

In the production area A1, the plurality of production facilities are collectively managed by a production management device 20 as an example of a job generation device and an information management device 29 (described below; see FIG. 2). The production management device 20 and the information management device 29 are connected to each of a plurality of production facilities via a wired or wireless network. The production management device 20 and the information management device 29 are configured in the same manner as a server, and each include a CPU, a memory, an external storage, an interface circuit, and the like.

On the other hand, in the warehouse area A2, two automatic warehouses 33A, a waste collection device 3, a consumable stock unit 4, a member stock unit 5, and the like are arranged in a line. Each automatic warehouse 33A stores multiple component storages W, identifies and manages types of the electronic components and the like stored in the component storages W, and automatically takes in and out requested electronic components and the like. In addition, the automatic warehouse 33A of the present embodiment has a component inlet/outlet 32C (32Ca and 32Cb), and automatically receives or delivers a component storage W requested for the conveyance robot 31A through the component inlet/outlet 32C. The waste collection device 3 stores waste generated in the component mounting device 14 of the mounting board production line L. In a case where the component storage W is a tape reel, when production of the mounting board is performed in the mounting board production line L, an empty used reel is generated as waste. The used reel is conveyed by the conveyance robot 31A. The consumable stock unit 4 accommodates and stores consumables used in the mounting board production line L, for example, solder, an adhesive, and the like. The member stock unit 5 similarly accommodates and stores equipment (for example, a component holding nozzle, a tape feeder, and a board under-supporting member) and the like used in the mounting board production line L.

A plurality of picking robots 32A are further arranged in the warehouse area A2. Each picking robot 32A is provided on the front side of the automatic warehouse 33A, the waste collection device 3, the consumable stock unit 4, and the member stock unit 5 so as to be able to travel along the row. The picking robot 32A is an example of the automatic work robot, and include: an arm unit for picking up the component storage in which electronic components and the like are stored and placing the component storage at a predetermined position: and a traveling unit provided below the arm portion for moving an arm to a predetermined position. The picking robot 32A picks up by the arm unit thereof the component storage taken out by the automatic warehouse 33A or the like, or the consumables or the like stored in the consumable stock unit 4, and the same to the conveyance robot 31A which is on standby near the picking robot 32A.

Figure 2:
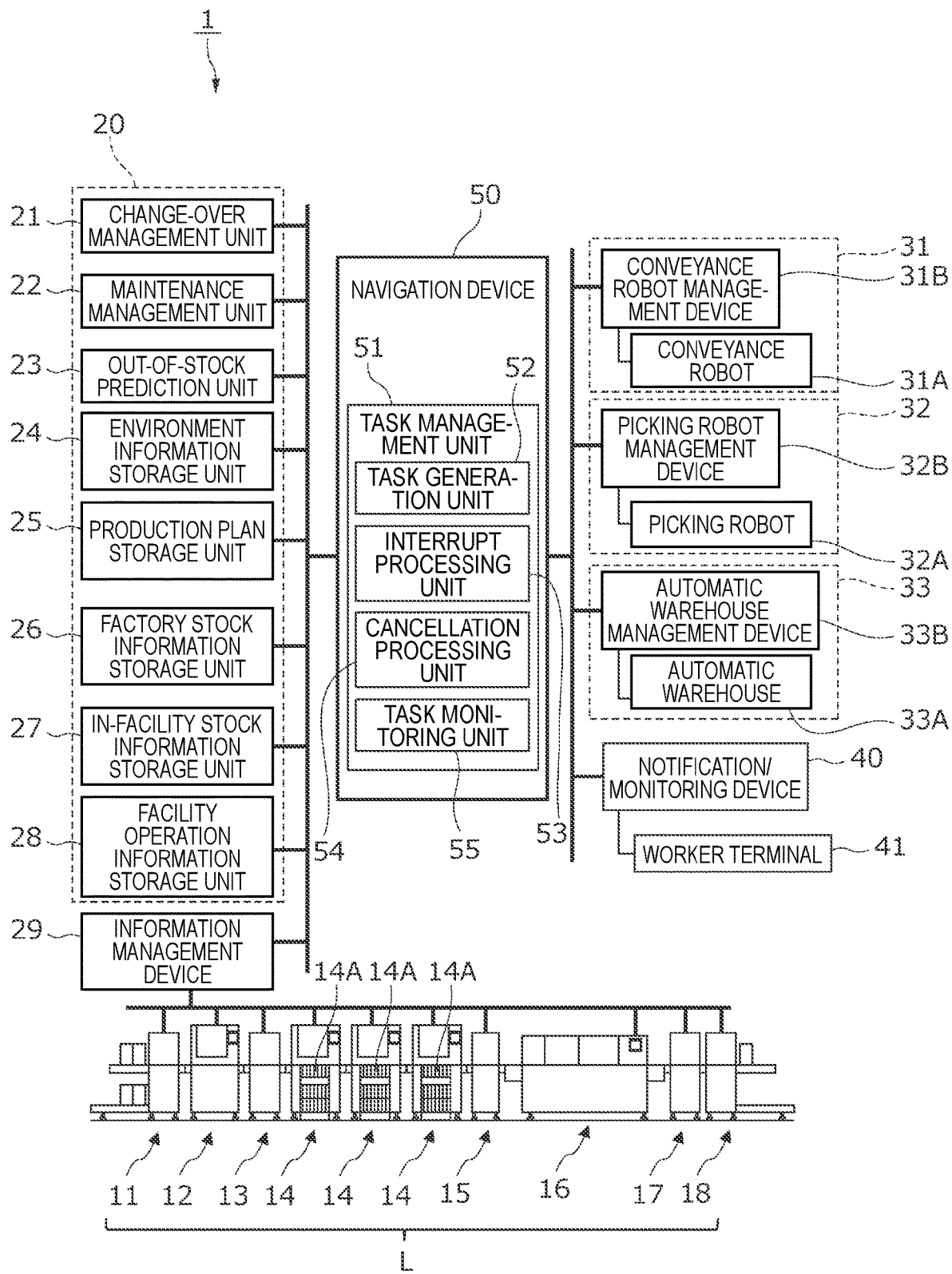
FIG. 2 is a block diagram illustrating a configuration of an integrated navigation system.

In the warehouse area A2, the two automatic warehouses 33A constitute the robot system 33, and are subjected to centralized management and operation control by an automatic warehouse management device 33B (see FIG. 2). The plurality of picking robots 32A constitute the robot system 32, and are subjected to centralized management and operation control by a picking robot management device 32B (see FIG. 2). The picking robot management device 32B and the automatic warehouse management device 33B are configured similarly to a server, and each include a CPU, a memory, an external storage, an interface circuit, and the like.

As described above, in the production site F, the production facilities of the mounting board production line L and the plurality of robot systems 31, 32, and 33 different from each other individually operate as systems different from each other. Therefore, in the present embodiment, in order to support the cooperation of the plurality of different robot systems, the navigation device 50 is further incorporated to construct the integrated navigation system 1.

<Configuration of Integrated Navigation System>

Next, a configuration of the integrated navigation system 1 according to the present embodiment will be described with reference to FIG. 2. FIG. 2 is a block diagram illustrating the configuration of the integrated navigation system 1.

As illustrated in FIG. 2, the integrated navigation system 1 includes the production management device 20 (an example of the job generation device) and the navigation device 50. The navigation device 50 transmits and receives data or information to and from the production management device 20, the information management device 29, the robot system 31, the robot system 32, the robot system 33, and a notification/monitoring device 40, and performs an integration process for cooperation of operations between the various robot systems. The various devices or robot systems are connected to each other via a wired or wireless network and the navigation device 50, and predetermined information, signals, and the like are transmitted and received.

The robot system 31 includes the conveyance robot 31A and the conveyance robot management device 31B described above. The robot system 32 includes the picking robot 32A and the picking robot management device 32B described above. The robot system 33 includes the automatic warehouse 33A and the automatic warehouse management device 33B described above. The navigation device 50 transmits work commands such as tasks to be executed by the conveyance robot 31A, the picking robot 32A, and the automatic warehouse 33A to the conveyance robot management device 31B, the picking robot management device 32B, and the automatic warehouse management device 33B, respectively. Each of the conveyance robot management device 31B, the picking robot management device 32B, and the automatic warehouse management device 33B causes any corresponding one of the conveyance robot 31A, picking robot 32A, and automatic warehouse 33A to execute a task corresponding to the work command based on the work command from the navigation device 50. The notification/monitoring device 40 is a device that collectively provides information including an operation status and the like related to the production site F to the worker H or the like or the outside. A worker terminal 41 is wirelessly connected to the notification/monitoring device 40.

The production management device 20 includes a change-over management unit 21, a maintenance management unit 22, an out-of-stock prediction unit 23, an environment information storage unit 24, a production plan storage unit 25, a factory stock information storage unit 26, an in-facility stock information storage unit 27, and a facility operation information storage unit 28. Accordingly, the production management device 20 generates a job related to production based on information sent from the plurality of production facilities deployed at the production site F.

The change-over management unit 21, the maintenance management unit 22, and the out-of-stock prediction unit 23 generate a job related to production in the mounting board production line L. Specifically, based on a production plan stored in the production plan storage unit 25, the change-over management unit 21 generates a job related to conveyance of electronic components, members, and the like necessary for the next production, and transmits the job to the navigation device 50. The maintenance management unit 22 generates a job related to conveyance of replacement members and the like based on facility operation information of the facility operation information storage unit 28, and transmits the job to the navigation device 50.

The out-of-stock prediction unit 23 predicts out-of-stock times of the electronic components and the consumables based on in-facility stock information of the in-facility stock information storage unit 27, the production plan of the production plan storage unit 25, and the facility operation information of the facility operation information storage unit 28, and generates a job related to conveyance of the electronic components and the consumables. Each of the change-over management unit 21, the maintenance management unit 22, and the out-of-stock prediction unit 23 transmits the generated job to the navigation device 50. The navigation device 50 generates tasks as work commands for the conveyance robot 31A, the automatic warehouse 33A, and the picking robot 32A based on the transmitted job.

The job referred to in the present embodiment means an instruction at a level of an object to be realized by executing a plurality of predetermined tasks. Each task means an instruction at a level of a unit for realizing the job corresponding to the task. That is, a plurality of tasks are executed as a series of command sets (work commands) by the conveyance robot 31A, the automatic warehouse 33A, and the picking robot 32A, respectively, so that one job is achieved as the purpose. One job is realized via a plurality of tasks.

In the present embodiment, an ID (identification information) is assigned to each of the job and the tasks. The job is managed and executed as a parent ID, and the task is managed and executed as a child ID associated with the parent ID (see FIG. 3). In addition, each of the job and the tasks is added with time information of scheduled execution or completion of the job or the task (for example, a scheduled task time described below) and an ID of the automatic working robot to execute the task.

The environment information storage unit 24, the production plan storage unit 25, the factory stock information storage unit 26, the in-facility stock information storage unit 27, and the facility operation information storage unit 28 each store and hold predetermined information. Specifically, the environment information storage unit 24 stores and holds environment information necessary for the navigation device 50 to generate the tasks, such as a layout of the production facilities, the automatic warehouses 33A, and the like in the production site F, and a travel range (for example, a length of a movement line) of the conveyance robots 31A, the picking robots 32A, and the like. The production plan storage unit 25 stores and holds information (a so-called production program) for setting in advance when, how many and which type of mounting boards is to be produced in which mounting board production line L. The factory stock information storage unit 26 stores and holds information on the numbers and locations of electronic components W2, the consumables, and the various members in the automatic warehouses 33A, the consumable stock unit 4, and the member stock unit 5.

The in-facility stock information storage unit 27 stores and holds information on the remaining number of electronic components and consumables set in the mounting board production line L. The facility operation information storage unit 28 stores and holds the operation status of the production facilities, the produced number of mounting boards, and the like. The information stored and held by the environment information storage unit 24, the production plan storage unit 25, the factory stock information storage unit 26, the in-facility stock information storage unit 27, and the facility operation information storage unit 28 is read in response to a request from the change-over management unit 21, the maintenance management unit 22, and the out-of-stock prediction unit 23.

The information management device 29 is provided between the integrated navigation system 1 and the production facilities, functions as an interface of information. The information management device 29 collects information from the mounting board production line L, and causes the environment information storage unit 24, the production plan storage unit 25, the factory stock information storage unit 26, the in-facility stock information storage unit 27, and the facility operation information storage unit 28 of the production management device 20 described below to each store and hold information thereof. At the same time, the information management device 29 also collects information such as the number of remaining electronic components W2, the number of operations of movable parts in the production facilities, and measurement/monitoring results.

The navigation device 50 includes a task management unit 51. The task management unit 51 of the navigation device 50 includes a task generation unit 52, an interrupt processing unit 53, a cancellation processing unit 54, a task monitoring unit 55, and a storage unit (not illustrated). Thereby, the navigation device 50 generates a task, which is a work command to the plurality of different robot systems 31, 32, 33, for each robot system based on the job, and sends the task of the robot system to each corresponding robot system.

The task generation unit 52 generates tasks for at least one of the robot systems 31, 32, 33 based on the transmitted job. When an interrupt of a task occurs, the interrupt processing unit 53 executes addition, rearrangement, and the like of the task. When cancellation of a job occurs, the cancellation processing unit 54 cancels tasks related to the task.

The task monitoring unit 55 collects execution status, such as waiting for processing, being processed, or stopped due to a trouble, of each task that have been transmitted to the conveyance robots 31A, the automatic warehouses 33A, and the picking robots 32A individually from the corresponding robot systems (specifically, the conveyance robot management device 31B, the picking robot management device 32B, and the automatic warehouse management device 33B). The task monitoring unit 55 stores a result of the collection in the storage unit in a state in which the execution status is in association with identification information (ID) of the corresponding automatic work robot (for example, the conveyance robots 31A, the automatic warehouses 33A, and the picking robots 32A). When the task monitoring unit 55 determines that it is optimal to cause the automatic working robots to cooperate with each other on the task, the task monitoring unit 55 notifies that one of the plurality of automatic working robots has ended to the others.

On the other hand, the respective robot systems 31, 32, 33 (specifically, the conveyance robot management device 31B, the picking robot management device 32B, and the automatic warehouse management device 33B) receive the respective tasks transmitted from the navigation device 50. The conveyance robot management device 31B, the picking robot management device 32B, and the automatic warehouse management device 33B each reply to the navigation device 50 with a scheduled time (scheduled task time) in response to the reception. The conveyance robot management device 31B, the picking robot management device 32B, and the automatic warehouse management device 33B each determine whether the task transmitted by the navigation device 50 is to be executed, and reply to the navigation device 50 with the ID of the automatic working robot to execute the task based on the determination result. When the navigation device 50 receives the notification of the scheduled task time, the navigation device 50 stores the scheduled task time in the storage unit in association with the ID of the corresponding automatic working robot.

When respectively executing the tasks transmitted from the navigation device 50, the conveyance robot management device 31B, the picking robot management device 32B, and the automatic warehouse management device 33B notify the navigation device 50 of the ID of at least one task being processed and an execution status notification indicating the end of the task together with a start notification of the task. At this time, in a case where an error occurs in a predetermined job, the conveyance robot management device 31B, the picking robot management device 32B, and the automatic warehouse management device 33B each transmit an error notification thereof to the navigation device 50. When the navigation device 50 receives the execution status notification, the navigation device 50 stores the execution status of the task in the storage unit in association with the ID of the corresponding automatic working robot.

Some of the tasks generated by the task generation unit 52 do not involve designation of the automatic working robots belonging to the robot systems 31, 32, 33. For example, in a case where the task generation unit 52 or the navigation device 50 can confirm information of the components stored in the automatic warehouses 33A from the of the factory stock information storage unit 26, the task generation unit 52 generates a task in which the automatic warehouse 33A in which the target component is stored is designated. On the other hand, in a case where the task generation unit 52 or the navigation device 50 cannot grasp a location or a state as in a case of the conveyance robots 31A, the task generation unit 52 generates a task that only transmits a work content without designating the conveyance robot 31A. When the conveyance robot management device 31B receives the task that only transmits the work content without designating the conveyance robot 31A, the conveyance robot management device 31B determines the conveyance robot 31A suitable for the work and causes the conveyance robot 31A to execute the task. That is, when the robot systems 31, 32, 33 are entrusted to designate the automatic work robot for executing the task, the task generation unit 52 generates a task that does not involve the designation of the automatic work robot and issues an instruction to the robot systems 31, 32, 33.

<Processing of Navigation Device>

Next, a plurality of processes executed by the navigation device 50 will be further described. The navigation device 50 executes at least task monitoring process, task cooperation process, recovery process, optimization process, and cancellation process to support cooperation of the plurality of different robot systems each including at least one automatic work robot operating at the production site F. Hereinafter, the processes will be described as an example, but the processes executed by the navigation device 50 are not limited to such processes. The navigation device 50 is capable of executing various other processes.

(Task Monitoring Process)

The task monitoring process is a function of monitoring the task executed by the automatic working robot to monitor the current progress status and the occurrence status of abnormality, and is a process for, in a case where an error occurs due to a failure, a trouble, or the like in some of the automatic working robots, notifying the outside of the system such as the worker H and an upstream device of information.

In the present embodiment, as one example of the task monitoring process, the navigation device 50 has a function (task progress management) of monitoring progress of a task or a job by comparing actual start time and end time of the task received from the robot system corresponding to the automatic working robot with a scheduled task time. In the task progress management, when a delay occurs in which the actual time is delayed from the scheduled task time, information on the delay is notified to the worker H of the production site F, a person in charge of production management, or the other robot systems that cooperate with the worker H. Further, the navigation device 50 includes, as another function of the task monitoring process, an abnormality notification process of detecting and notifying an abnormality of the task. In the abnormality notification process, a time elapsed from the start of the task is monitored, and when no end notification of the task is received even when a predetermined time has elapsed significantly, it is considered that some abnormality has occurred in the automatic working robot that executes the task, and such information is notified to the worker terminal 41 carried by the worker H at the production site F. At this time, the abnormality notification also includes information on the task and the job corresponding to the task. The worker H grasps the abnormality through the worker terminal 41, confirms the occurrence of the abnormality, and responds to the abnormality.

(Task Cooperation Process)

The task cooperation process is a process for performing sequence (order) control, for example, such that the work of one automatic working robot does not interfere with the work of the other automatic working robots.

In the present embodiment, as one example of the task cooperation process, when the navigation device 50 receives at least one execution status notification from a robot system corresponding to any one of the automatic working robots, the navigation device 50 transmits an instruction related to a conditional task based on the end of the one task to a robot system corresponding to another automatic working robot. The robot system that has received this instruction instructs the automatic work robot that is set with the conditional task among the managed automatic work robots to execute the conditional task. In this manner, based on the transmission of the instruction, the automatic work robot of the corresponding robot system executes the conditional task.

The conditional task referred to here corresponds to a task to be executed later in time series among at least two tasks whose relevance (for example, subordinate-superior relationship) is recognized in time series, for example. That is, unless one task (precondition task described below) is ended, the conditional task cannot be started. The conditional task will be described in detail with reference to FIGS. 13 to 16.

(Recovery Process)

The recovery process is, for example, a process for enabling the production site F to operate without stagnating the production of the entire production site F even in a case where an error occurs in some of the automatic work robots due to a failure or the like and the work becomes partially impossible. In the present embodiment, the recovery process is appropriately executed by the interrupt processing unit 53 of the navigation device 50 according to an occurrence situation of the error.

For example, in a case where the interrupt processing unit 53 of the navigation device 50 receives an error notification relating to a predetermined job from a robot system corresponding to any one of the automatic work robots, the interrupt processing unit 53 generates, by the task generation unit 52, an alternative task of the task sent to the automatic work robot that has sent the error notification (for example, the conveyance robot 31A). The interrupt processing unit 53 of the navigation device 50 transmits the generated alternative task to a robot system corresponding to another automatic working robot of the same type as the error automatic working robot (for example, the conveyance robot 31A).

(Optimization Process)

The optimization process is a process of, in a case where at least one job occurs later than a predetermined job, combining the plurality of jobs in order to efficiently execute the plurality of jobs. In the present embodiment, as some of the optimization process, for example, a first and a second optimization processes are appropriately executed by the navigation device 50 according to a generation state of the plurality of jobs.

In the first optimization process, for example, the navigation device 50 determines whether a second job to be executed earlier than a first job has been generated. Here, both the first and second jobs are generated by the production management device 20, and the second job is a job to be executed before the start of the first job. In a case where it is determined that the second job is generated as a result of the determination, the navigation device 50 generates a task based on the second job for each automatic work robot. The navigation device 50 generates an integrated task by optimizing (integrating) tasks of the automatic working robots based on the second job and tasks of the automatic working robots based on the first job in accordance with, for example, a cooperation condition between the tasks set in advance. After the integrated task is generated, the navigation device 50 transmits the integrated task to the robot systems corresponding to the automatic work robots, so as to update the tasks.

In the second optimization process, when the navigation device 50 determines that the second job to be executed earlier than the first job has been generated as described above, the navigation device 50 further determines a temporal order, a priority order, and the like of tasks based on the first job or tasks based on the second job. Based on the result of the determination, the navigation device 50 changes the execution order of the tasks based on the first job and the tasks based on the second job, so as to update these tasks. The navigation device 50 transmits the tasks whose execution order has been changed to the robot systems corresponding to the corresponding automatic work robots.

(Cancellation Process)

The cancellation process is a process for deleting, correcting, or restoring a task when a cancellation notification is received in the optimization process described above.

In the present embodiment, as one example of the cancellation process, first, when the cancellation processing unit 54 of the navigation device 50 receives the cancellation notification of the first job in the generation of the integrated task (optimization process) based on both the first job and the second job, the cancellation processing unit 54 determines whether the predetermined task is to be deleted, corrected, or restored based on a situation of the tasks of the automatic working robots as a whole.

As a result of the determination, when the cancellation processing unit 54 of the navigation device 50 determines that the predetermined task is to be deleted, the cancellation processing unit 54 deletes a predetermined unprocessed task. That is, at a time of receiving the cancellation notification, the cancellation processing unit 54 of the navigation device 50 deletes unprocessed tasks of an automatic working robot (for example, the picking robot 32A as an example of the second automatic working robot) different from the automatic working robot (for example, the conveyance robot 31A as an example of the first automatic working robot) scheduled to execute the tasks based on the first job. The navigation device 50 notifies the robot system 32 corresponding to the picking robot 32A (second automatic work robot) of a work notification of the unprocessed tasks. As a result, due to the optimization process of the navigation device 50, the picking robot 32A (second automatic working robot) does not execute the unprocessed tasks which become unnecessary due to the cancellation, so that the work efficiency of the automatic working robot can be improved.

On the other hand, when the cancellation processing unit 54 of the navigation device 50 determines that the predetermined task is to be corrected, the cancellation processing unit 54 corrects the predetermined task. That is, at the time of receiving the cancellation notification, the navigation device 50 corrects some of the unprocessed tasks of the conveyance robot 31A (first automatic work robot). The navigation device 50 notifies the robot system 31 corresponding to the conveyance robot 31A (first automatic work robot) of the unprocessed tasks after the correction. Accordingly, it is possible to continue the production by correcting some of the tasks without stagnating the production site F.

On the other hand, when the cancellation processing unit 54 of the navigation device 50 determines that the predetermined task is to be restored, the cancellation processing unit 54 restores the predetermined task. That is, at the time of receiving the cancellation notification, the cancellation processing unit 54 of the navigation device 50 generates, through the task generation unit 52, a recovery task for recovering to a state before execution of the processed task of the picking robot 32A (second automatic working robot). The navigation device 50 notifies the robot system 32 corresponding to the picking robot 32A (second automatic work robot) of the recovery task.

As a result, the navigation device 50 of the present embodiment can effectively support sophisticated cooperation of operations between robot systems, which are provided by a plurality of different vendors (manufacturers) and each include at least one automatic work robot, in the production site F such as a factory and to improve versatility and expandability as a system. In addition, even automatic working robots having different system specifications can cooperate with each other, and the production site F can operate as smoothly as possible without stagnating the production of the entire production site F even in a case where an error occurs due to a failure or the like in some of the automatic working robots.

Next, with reference to FIGS. 3 to 12, the operation of the present embodiment will be described in more detail according to a specific example (hereinafter, also referred to as a "scenario") using the navigation device 50 configured as described above. First to third scenarios will be described below.

[First Scenario]

Figure 4:
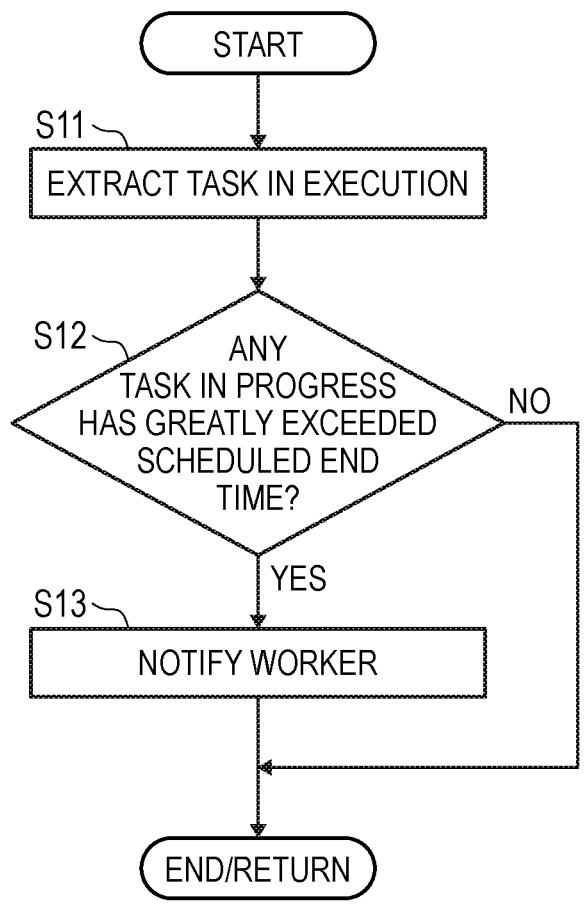
FIG. 4 is a flowchart illustrating an abnormality notification process.
Figure 5:
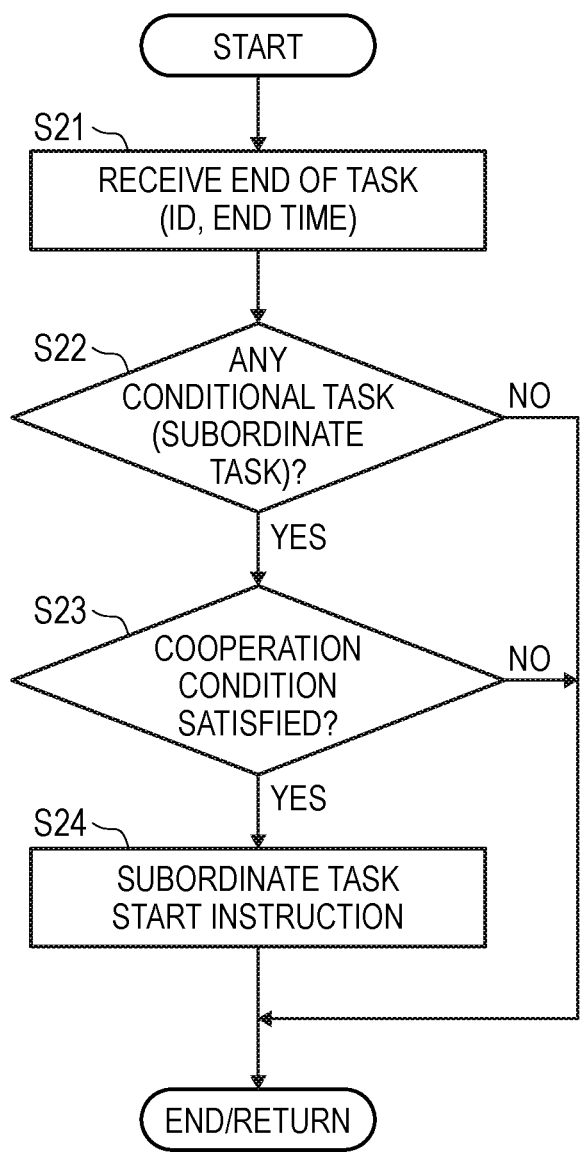
FIG. 5 is a flowchart illustrating a cooperation process.
Figure 6:
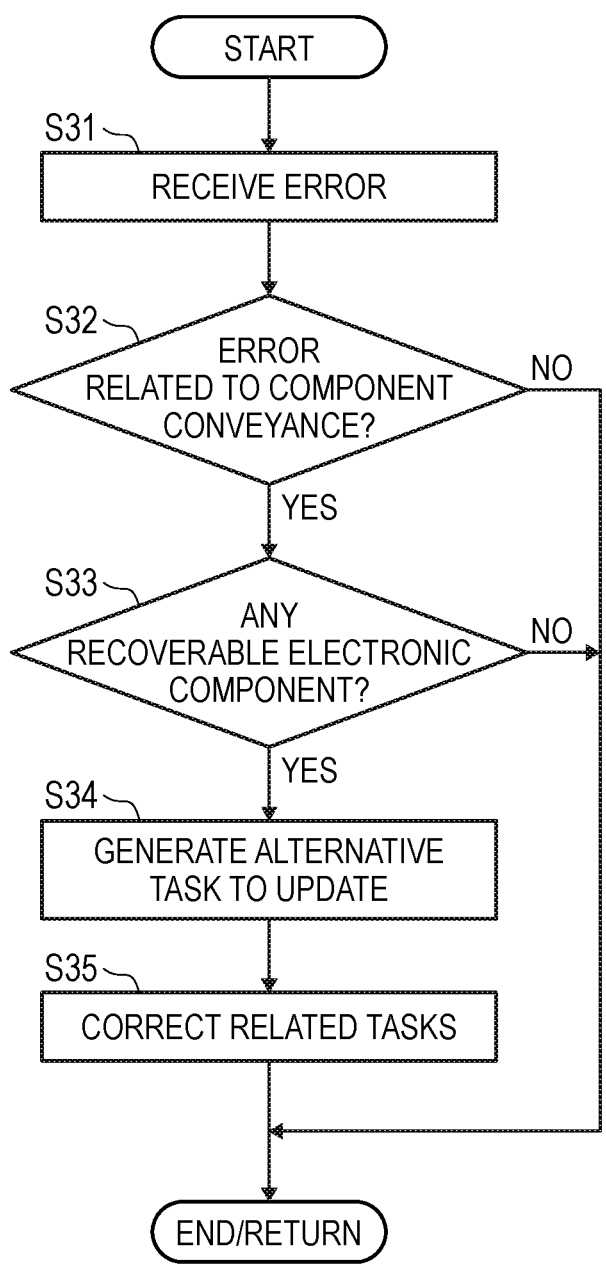
FIG. 6 is a flowchart illustrating a recovery process.

First, the present embodiment will be described based on the first scenario with reference to FIGS. 3 to 6. FIG. 3 is a table exemplifying contents of a job and tasks when a component conveyance request job occurs. FIG. 4 is a flowchart illustrating the abnormality notification process. FIG. 5 is a flowchart illustrating the cooperation process. FIG. 6 is a flowchart illustrating the recovery process.

As illustrated in FIG. 3, the first scenario is an example in a case where a component conveyance request job ID100 occurs from the out-of-stock prediction unit 23 of the production management device 20. In the first scenario, the component conveyance request job ID100 is transmitted from the out-of-stock prediction unit 23 of the production management device 20 to the navigation device 50.

In this scenario, the number "100" is assigned as the ID of the component conveyance request job, but is not limited thereto. As long as being distinguishable from other jobs, it is possible to adopt various alphabetic characters, combinations of alphabetic characters and numbers, and the like.

A content of the component conveyance request job ID100 in this scenario is set to, for example, "Convey electronic component W2$a$ to component supply unit 14A of component mounting device 14 by time T1.". The component conveyance request job ID100 is transmitted to the navigation device 50. The task generation unit 52 of the navigation device 50 generates a task for each automatic work robot, that is, tasks for the conveyance robots 31A, tasks for the automatic warehouses 33A, and tasks for the picking robots 32A, according to the component conveyance request job ID100. The task generation unit 52 sets the child ID of each task for the automatic warehouses 33A in a 10 series, the child ID of each task for the conveyance robots 31A in a 30 series, and the child ID of each task for the picking robots 32A in a 50 series, so that the tasks can be distinguished from each other. The above-described symbol "T1" represents a predetermined time (hour, minute, second, and the like). The above-described symbol "W2$a$" represents the electronic component W2 in the first scenario.

Specifically, as a task for the robot system 33 (for example, the automatic warehouses 33A), a task "Convey electronic component W2$a$ to component inlet/outlet 32Ca." is generated (see FIG. 1). In this task, "10" is assigned as a child ID associated with the ID of the component conveyance request job (parent ID), that is, ID100, and is managed as ID100-10 which is combined with the ID of the job.

In this scenario, the child ID, which is an identifier of each task, is assigned a number corresponding to an order thereof. Specifically, a smaller number is assigned to a preceding task than to a subsequent task, but is not limited thereto. The tasks may be in any order as long as being manageable, for example, the order thereof may be managed by a separately provided sequence control unit or the like. The same applies to the second and third scenarios described below.

In addition, as a task for the robot system 31 (for example, the conveyance robots 31A), two tasks including "Move to component receiving position P1$a$." and "Wait at component receiving position P1$a$." are generated (see FIG. 1). Similarly, ID100-30 and 100-31 are assigned to the respective tasks. Further, as a subsequent task of ID100-52, which will be described below, a task "Move to stop position P2 after ID100-52 is ended." is similarly generated, and ID100-32 is assigned to this subsequent task (see FIG. 1).

In addition, as a task for the robot system 32 (for example, the picking robots 32A), two tasks including "Move to work position P3*a*." and "Wait at work position P3*a*." are generated (see FIG. 1). Similarly, ID100-50 and 100-51 are assigned to the respective tasks. Further, as a subsequent task of ID100-10 and ID100-31 described above, a task "Convey electronic component W2*a* of component inlet/outlet 32Ca to component receiving position P1*a* when ID100-10 and ID100-31 are ended." is similarly generated, and ID100-52 is assigned to this subsequent task.

In this scenario, with the job and the tasks being configured in this manner, the navigation device 50 transmits the tasks to the robot systems 31, 32, 33. Each of the robot systems 31, 32, 33 returns, to the navigation device 50, a required task time including a time required from a start to an end of the tasks.

In addition, each of the robot systems 31, 32, 33 returns identification information (robot ID) capable of specifying the automatic work robot to which the task is assigned to the navigation device 50. The navigation device 50 stores the required task times replied from the robot systems 31, 32, 33, and monitors progress of the tasks executed by the robot systems 31, 32, 33. If the required task time can be calculated by the navigation device 50, notifications from the robot systems are not necessary.

Next, an abnormality notification process, which is an example of the function of monitoring the progress of the tasks, will be described. The task monitoring process is executed by the task monitoring unit 55 of the navigation device 50. The task monitoring process is a process of monitoring whether a started task has ended normally. That is, in a case where the started task has not ended even when the time of the task has greatly exceeded the initial scheduled time, it is considered that some abnormality or trouble has occurred in the work robot that executes the task, and the worker in the production site F is notified of the occurrence of the abnormality or trouble. FIG. 4 shows the flow of the task monitoring process. First, tasks that are currently in progress, that is, tasks that have started and have not ended yet are extracted (S11). Next, it is checked whether the tasks in progress have greatly exceeded the scheduled end time (S12). The task monitoring unit 55 sets a timing at which a required task time elapses from the start of a task as the scheduled end time of the task, and determines a task that has not ended even when the predetermined time elapses from the scheduled end time as greatly exceeding the scheduled end time. As a result of the determination, in a case where it is determined that no tasks that have greatly exceeded the scheduled end time are present (No in S12), the process is ended or returns to another process (END/RETURN). In a case where it is determined that a task that has greatly exceeded the scheduled end time is present (YES in S12), the task monitoring unit 55 notifies the worker terminal 41 possessed by the worker H at the production site F of the abnormality (S15). At this time, the robot ID executing the task or the name and the location registered in the robot ID, and the information of the task and the job being executed are also notified to the worker. As a result, the worker can rush to the work robot that needs to be checked, and can quickly perform an appropriate treatment.

In this scenario, as shown in FIG. 5, the navigation device 50 executes the task cooperation process described above.

That is, the navigation device 50 receives a notification that a predetermined task has ended from a robot system corresponding to any one of the automatic work robots (S21). At this time, the navigation device 50 receives information on the ID of the task and the end time of the task. It is determined whether a conditional task (for example, a task which has a subordinate-superior relationship with the ended task and is subordinate to the task) is present with respect to the ended task (S22). As a result of the determination, in a case where it is determined that no conditional tasks are present (NO in S22), the process is ended or returns to another process (END/RETURN). On the other hand, in a case where it is determined that a conditional task is present (YES in S22), the navigation device 50 determines whether a cooperation condition between tasks set in advance is satisfied (S23). As a result of the determination, in a case where it is determined that the cooperation condition is not satisfied (NO in S23), the process is ended or returns to another process (END/RETURN). On the other hand, in a case where it is determined that the cooperation condition is satisfied (YES in S23), the navigation device 50 transmits a start instruction of the conditional task to the robot system corresponding to the automatic working robot that executes the conditional task (S24).

In a case where an abnormality occurs during execution of the task, the navigation device 50 executes the above-described recovery process within a possible range.

That is, the navigation device 50 receives an error notification related to a predetermined job from the robot system corresponding to any one of the automatic work robots (S31). The navigation device 50 determines whether the error is an error related to component conveyance based on a content of the error notification (S32). As a result of the determination, in a case where it is determined as not related to component conveyance (NO in S32), the process is ended or returns to another process (END/RETURN). On the other hand, in a case where it is determined as related to component conveyance (YES in S32), it is determined whether a recoverable (for example, can be replaced or combined) electronic component W2 is present (S33). As a result of the determination, in a case where it is determined that no recoverable electronic components W2 are present (NO in S33), the process is ended or returns to another process (END/RETURN). On the other hand, in a case where it is determined that a recoverable electronic component W2 is present (YES in S33), the navigation device 50 generates an alternative task by the task generation unit 52, and transmits the generated alternative task to the robot system corresponding to the automatic work robot so as to update the tasks (S34). The navigation device 50 corrects the related tasks and transmits the corrected tasks to the robot system corresponding to the automatic work robot so as to update the tasks (S35).

[Second Scenario]

Figure 7:
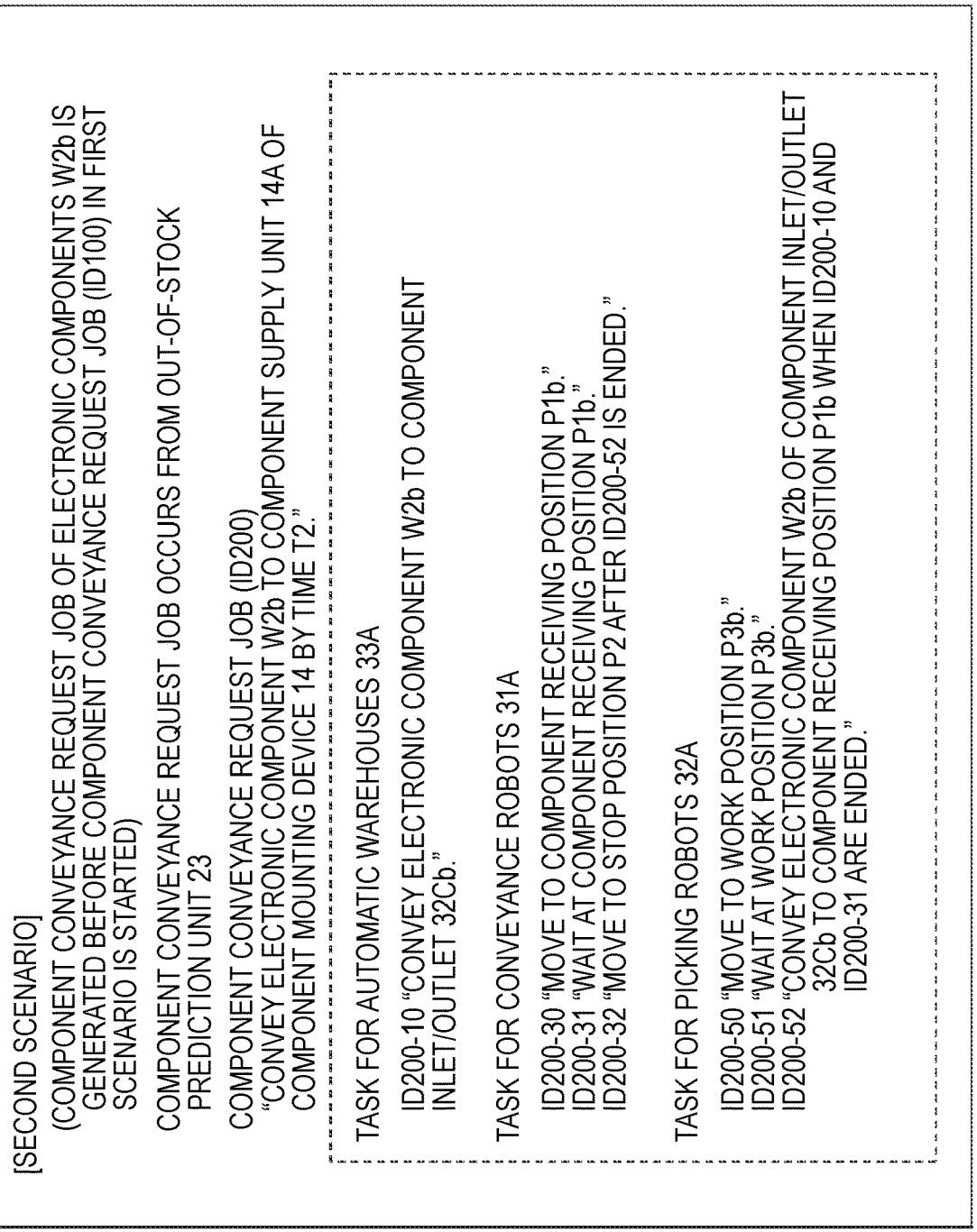
FIG. 7 is a table exemplifying contents of jobs and tasks when two component conveyance request jobs occur.
Figure 9:
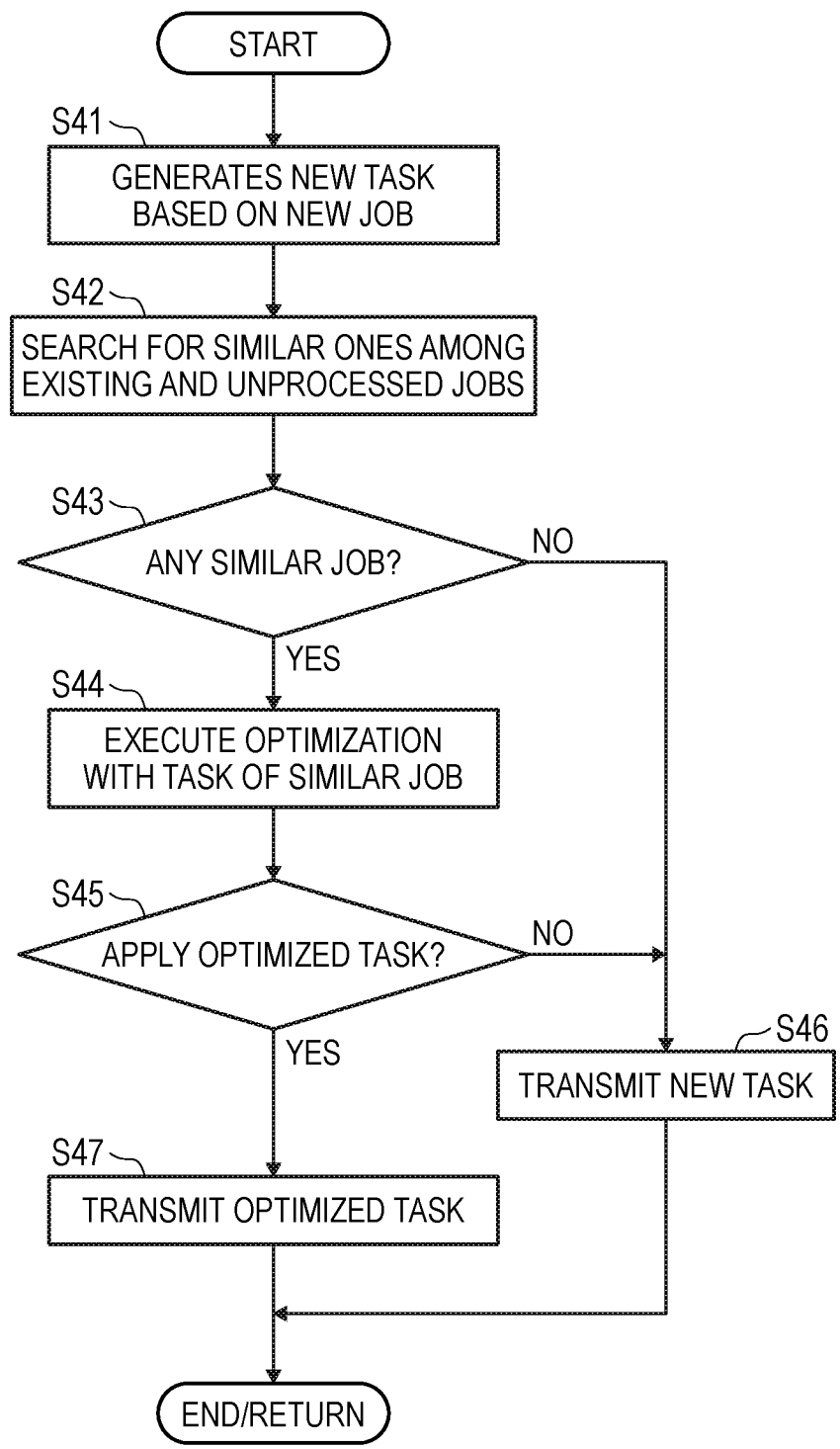
FIG. 9 is a flowchart illustrating the optimization process for the two component conveyance request jobs.

Next, the present embodiment will be described based on the second scenario with reference to FIGS. 7 to 9. FIG. 7 is a table exemplifying contents of jobs and tasks when two component conveyance request jobs occur. FIG. 8 is a table exemplifying a state in which the two component conveyance request jobs are subjected to an optimization process based on an order thereof. FIG. 9 is a flowchart illustrating the optimization process for the two component conveyance request jobs. The same or equivalent parts as those of the first scenario described above are denoted by the same reference numerals in the drawings, and description thereof will be omitted or simplified.

As illustrated in FIG. 7, the second scenario is an example of a case where a component conveyance request job (second job) ID200 of other electronic components W2*b* is generated before the component conveyance request job (first job) ID100 in the first scenario is started. The component conveyance request job ID200 is a job to be executed earlier than the component conveyance request job ID100. Similarly, the component conveyance request job ID200 is also transmitted from the out-of-stock prediction unit 23 of the production management device 20 to the navigation device 50.

A content of the component conveyance request job ID200 in this scenario is set to, for example, "Convey electronic component W2*b* to component supply unit 14A of component mounting device 14 by time T2.". The task generation unit 52 of the navigation device 50 generates a task for each automatic work robot according to the component conveyance request job ID200. Similarly to the first scenario, the task generation unit 52 sets the child ID of each task for the automatic warehouses 33A in the 10 series, the child ID of each task for the conveyance robots 31A in the 30 series, and the child ID of each task for the picking robots 32A in the 50 series. The above-described symbol "T2" represents a predetermined time, and is set to a time earlier than the above-described T1. The above-described symbol "W2*b*" represents the electronic component W2 in the second scenario.

Specifically, as a task for the robot system 33 (for example, the automatic warehouses 33A), a task "Convey electronic component W2*b* to component inlet/outlet 32Cb." is generated (see FIG. 1). ID200-10 is assigned to the task.

As a task for the robot system 31 (for example, the conveyance robots 31A), two tasks including "Move to component receiving position P1*b*." and "Wait at component receiving position P1*b*." are generated (see FIG. 1). Similarly, ID200-30 and 200-31 are assigned to the respective tasks. Further, as a subsequent task of ID200-52, which will be described below, a task "Move to stop position P2 after ID200-52 is ended." is similarly generated, and ID200-32 is assigned to this subsequent task.

In addition, as a task for the robot system 32 (for example, the picking robots 32A), two tasks including "Move to work position P3*b*." and "Wait at work position P3*b*." are generated (see FIG. 1). Similarly, ID200-50 and ID200-51 are assigned to the respective tasks. Further, as a subsequent task of ID200-10 and ID200-31 described above, a task "Convey electronic component W2*b* of component inlet/outlet 32Cb to component receiving position P1*b* when ID200-10 and ID200-31 are ended." is similarly generated, and ID200-52 is assigned to this subsequent task.

In this manner, first, the component conveyance request job ID200 as the second job in the present scenario and the tasks 200-10 to 200-52 based on the job are generated by the task generation unit 52 of the navigation device 50. Next, the task generation unit 52 executes optimization processing for the component conveyance request job ID100 as the first job and the component conveyance request job ID200 as the second job. That is, the task generation unit 52 combines the tasks so as to efficiently execute the order of the component conveyance request jobs ID100 and ID200.

As illustrated in FIG. 8, regarding the tasks for the conveyance robots 31A, the tasks 200-30 and 200-31 are temporally arranged in a preceding order so as to be executable earlier than the tasks ID100-31 and ID100-32. The task 100-32 and the task 200-30 are integrated between the tasks ID200-30, ID200-31 and the tasks ID100-31, ID100-32, so that a new task "Move to component receiving position P1*a* when ID200-52 is ended." is generated, and ID200-34 is assigned to the new task.

In addition, regarding the tasks for the picking robots 32A, a task group of the tasks ID200-50, ID200-51, ID200-52 is executed as a whole earlier than a task group of the tasks ID100-50, ID100-51, ID100-52. Therefore, the navigation device 50 integrates the tasks by changing the execution order of the tasks ID100-50, ID100-51, ID100-52 and the tasks ID200-50, ID200-51, ID200-52 each as a whole. Regarding the tasks for the automatic warehouses 33A, none of ID100-10 and ID200-10 are changed before or after the optimization processing.

As described above, in order to integrate the component conveyance request job ID100 and the component conveyance request job ID200, the navigation device 50 executes the above-described optimization process as illustrated in FIG. 9 in the present scenario.

That is, the navigation device 50 generates a new task based on the new job (component conveyance request job ID200) to be executed earlier than the start of the predetermined job (component conveyance request job ID100) (S41). The navigation device 50 searches for similar ones among existing and unprocessed jobs (S42). The navigation device 50 determines whether a similar job is present through the search (S43). As a result of the determination, in a case where it is determined that no similar jobs are present (NO in S43), the navigation device 50 transmits the newly generated task to the robot system corresponding to the automatic working robot (S46).

On the other hand, in a case where it is determined that a similar job is present, the navigation device 50 executes an optimization process on a task of a predetermined automatic working robot based on the similar job (S44). After the optimization processing is executed, the navigation device 50 determines whether the optimized task should be applied to the automatic working robot (S45). As a result of the determination, in a case where it is determined as should not be applied (NO in S45), the navigation device 50 transmits the newly generated task to the automatic working robot as it is (S46). On the other hand, in a case where it is determined as should be applied (YES in S45), the navigation device 50 transmits the optimized task to the robot system corresponding to the automatic working robot (S47).

[Third Scenario]

Figure 12:
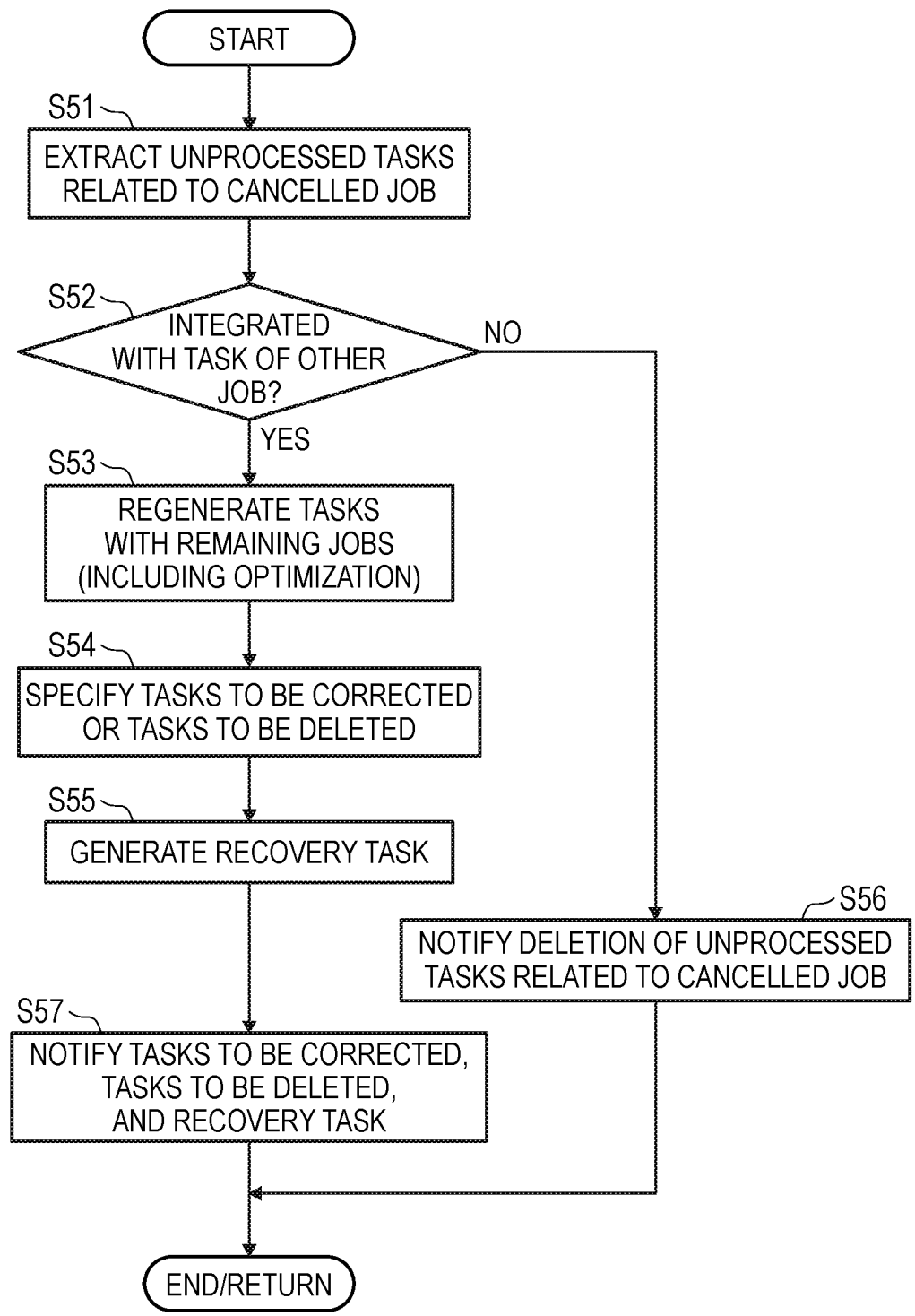
FIG. 12 is a flowchart illustrating the cancellation process for the one of the two component conveyance request jobs.

Next, the present embodiment will be described based on the third scenario with reference to FIGS. 10 to 12. FIG. 10 is a table exemplifying contents of jobs and tasks when at least one of the two component conveyance request jobs is cancelled. FIG. 11 is a table illustrating a state in which the cancellation process is performed when one of the two component conveyance request jobs is cancelled. FIG. 12 is a flowchart illustrating the cancellation process for the one of the two component conveyance request jobs.

The same or equivalent parts as those of the first scenario and the second scenario described above are denoted by the same reference numerals in the drawings, and description thereof will be omitted or simplified.

As illustrated in FIGS. 10 and 11, the third scenario is an example of a case where the two component conveyance request jobs ID100, ID200 in the second scenario are integrated and then the component conveyance request job ID100 is cancelled due to a delay of the conveyance robots 31A. In this scenario, some of the tasks of the component conveyance request job ID100 are executed by the automatic work robots, but the remaining tasks are executed by the worker H instead, so that the component conveyance request job ID200 is completed.

That is, in this scenario, cancellation of the component conveyance request job ID100 occurs during execution of the component conveyance request job ID100. As a task for the robot system 33 (for example, the automatic warehouses 33A) at this time, a task "Execute recovery task." is generated. IDR100-10 is newly assigned to this task. A content of the task IDR100-10 is "Accommodate electronic component W2 of component inlet/outlet 32Ca.", "Instruct worker H to remove electronic component W2 of the component inlet/outlet 32Ca.", or the like (see FIG. 1). At this time, as illustrated in FIG. 11, the tasks ID100-10 and ID200-10 have already been executed by the automatic warehouses 33A (see the tasks in the broken-line frames in FIG. 11). Therefore, after the cancellation process, the executed tasks are ignored, and no tasks are assigned to one of the automatic warehouses 33A.

In addition, as a task for the robot system 31 (for example, the conveyance robots 31A), the previous integrated ID100-34, ID100-31, ID100-32 are deleted by cancelling the component conveyance request job ID100. Instead, a task "Move to stop position P2 when task number 200-52 is ended." is newly generated, and ID200-35 is assigned to this task (see FIG. 1). As a result, the task ID200-35 is temporally arranged as a subsequent task of the task 200-30 and the task 200-31. The navigation device 50 notifies the robot system 31 corresponding to the conveyance robots 31A of the newly generated task.

Regarding the tasks for the robot system 32 (for example, the picking robots 32A), the tasks ID200-50, ID200-51, ID200-52 based on the component conveyance request job ID200 are not changed. These tasks ID200-50, ID200-51, ID200-52 are executed by the picking robots 32A as they are even after the component conveyance request job ID100 is cancelled. The tasks ID100-50, ID100-51, ID100-52 based on the component conveyance request job ID100 are not included in the tasks regenerated by the task generation unit 52 of the navigation device 50, and thus are deleted as a whole. Regarding this deletion, the navigation device 50 notifies the robot system 32 corresponding to the picking robots 32A that the tasks ID100-50, ID100-51, ID100-52 have been deleted.

As described above, in order to perform the process involving the cancellation of the component conveyance request job ID100, the navigation device 50 performs the above-described cancellation process as illustrated in FIG. 12 in the present scenario.

That is, the navigation device 50 extracts unprocessed tasks related to the cancelled job (S51). Based on the result of the extraction, the navigation device 50 determines whether the tasks are integrated with a task of another job (S52). As a result of the determination, in a case where it is determined as not integrated, the navigation device 50 notifies the robot systems corresponding to the automatic working robots of deletion of the unprocessed tasks related to the canceled job. On the other hand, in a case where it is determined as integrated, the task generation unit 52 of the navigation device 50 regenerates the tasks with the remaining jobs that are not cancelled (S53). At this time, the optimization processing is also executed as appropriate.

After the regeneration, the navigation device 50 specifies tasks to be corrected or tasks to be deleted due to the regeneration of the task (S54). After identifying these tasks, the task generation unit 52 of the navigation device 50 generates a recovery task (S55). After the recovery task is generated, the navigation device 50 notifies the robot systems corresponding to the automatic work robots of the tasks to be corrected, the tasks to be deleted, and the recovery task (S57).

As described above, according to the navigation device 50 and the navigation method according to the present embodiment, the job related to production is generated based on the information sent from the plurality of production facilities deployed at the production site F (that is, a job generation step). The navigation device 50 generates a task, which is a work command to each of a plurality of different robot systems 31, 32, 33, to each of the robot systems 31, 32, 33 based on the job, and sends the task of the robot system 31, 32, 33 to each corresponding robot system (that is, a work instruction step). Therefore, it is possible to effectively support sophisticated cooperation of operations between robot systems provided by a plurality of different vendors (manufacturers) in the production site (F) such as a factory and to improve versatility and expandability as a system.

When the navigation device 50 according to the present embodiment receives the notification of the scheduled task time replied from the corresponding robot system in response to reception of the task for each of the robot systems, the navigation device 50 stores the scheduled task time in the storage unit in association with the identification information (ID) of the corresponding robot system. Therefore, even in robot systems provided by different vendors, it is possible to perform comprehensive work time management for each work of the robot systems.

When the navigation device 50 according to the present embodiment receives the execution status notification sent from each of the robot systems and indicating the task is started, in execution, or ended, the navigation device 50 stores the execution status of the task in the storage unit in association with identification information of the corresponding robot system. Therefore, even in robot systems provided by different vendors, it is possible to perform integrated work progress management for each work of the robot systems.

In a case where the navigation device 50 does not receive the start notification of the task from any of the robot systems even after the predetermined time or more has elapsed from the scheduled task time corresponding to the identification information of the robot system, the navigation device 50 according to the present embodiment sends the abnormality notification including the task and the job corresponding to the task to the worker terminal 41. Therefore, in a case where an abnormality occurs in the progress management of the robot system, the abnormality notification is transmitted to the worker H. Therefore, even in the robot systems provided by different vendors, the worker H can grasp the abnormality in an integrated manner at an early stage and quickly cope with the abnormality.

When the navigation device 50 according to the present embodiment receives the execution status notification indicating at least one task is ended in any one of the robot systems, the navigation device 50 sends the start instruction of the conditional task based on the end of the at least one task to another robot system that executes the conditional task. Therefore, by performing sequence (order) management so that the work of one robot system does not interfere with the work of the other robot systems, it is possible to realize time-efficient production even in the robot systems provided by different vendors.

When the navigation device 50 according to the present embodiment receives the error notification regarding the predetermined job from any one of the robot systems, the navigation device 50 generates the alternative task having the same content as the task sent to the error robot system that sent the error notification (for example, the conveyance robot 31A of the robot system 31), and sends the alternative task to another robot system that controls an automatic working robot of the same type as the error robot system (for example, the conveyance robot 31A). Therefore, for example, in a case where some of the robot systems generate an error due to a failure or the like and become partially inoperable, it is possible to operate the production site F as much as possible without stagnating the production of the entire production site F even in the robot systems provided by different vendors.

When the navigation device 50 according to the present embodiment receives the error notification regarding the predetermined job from any one of the robot systems, the navigation device 50 generates the alternative task for changing the movement destination of another robot system (for example, the conveyance robot 31A of the robot system 31) that is moving to the installation point of the automatic working robot corresponding to the error robot system that sent the error notification and that is of a type different from the error robot system (for example, the conveyance robot 31A), and sends the alternative task to said another robot system. Accordingly, even in the robot systems provided by different vendors, the automatic work robot of another robot system working in the vicinity of the automatic work robot (for example, the conveyance robot 31A) of the error robot system performs the alternative task, so that the time loss due to the movement can be minimized.

After the alternative task is sent to said another robot system, the navigation device 50 according to the present embodiment corrects the conditional task based on the end of the alternative task, and sends the corrected conditional task to the robot system that executes the conditional task. Therefore, even when the alternative task changed from the predetermined task is generated, the influence of the generation of the alternative task on the other tasks can be minimized by correcting the conditional task associated with the alternative task.

When the second job to be executed earlier than the first job generated by the production management device (job generation device) 20 is generated before the start of the first job, the navigation device 50 according to the present embodiment generates tasks based on the second job, and sends to a first robot system the integrated task in which the task of the robot system based on the second job (for example, the conveyance robot 31A, which is an automatic work robot of the first robot system) and the task of the robot system based on the first job (for example, the conveyance robot 31A, which is an automatic work robot of the first robot system) are combined so as to be executable in the order of the second job and the first job. Therefore, in a case where at least one job occurs later, it is possible to combine a plurality of jobs and efficiently execute the plurality of jobs even in the robot systems provided by different vendors.

When the second job to be executed earlier than the first job generated by the production management device (job generation device) 20 is generated before the start of the first job, the navigation device 50 according to the present embodiment generates tasks based on the second job, and sends to the first robot system the task of the robot system based on the first job (for example, the conveyance robot 31A, which is an automatic work robot of the first robot system) and the task of the robot system based on the second job (for example, the conveyance robot 31A, which is an automatic work robot of the first robot system) after changing the execution order of the tasks. Therefore, in a case where at least one job occurs later, it is possible to appropriately change the execution order of the tasks of the robot system based on the jobs and efficiently execute the plurality of jobs even in the robot systems provided by different vendors.

When the navigation device 50 according to the present embodiment receives the cancellation notification of the first job, the navigation device 50 deletes the unprocessed tasks of the robot system (for example, the picking robot 32A, 31A, which is an automatic work robot of a second robot system) different from the robot system (for example, the conveyance robot 31A, which is an automatic work robot of the first robot system) at the time of receiving the cancellation notification, and notifies the deletion notification of the unprocessed tasks to the second robot system. Therefore, even in the robot systems provided by different vendors, the other (second) robot system does not need to execute the unprocessed tasks which becomes unnecessary due to the cancellation, and thus the work efficiency of the robot system can be improved.

When the navigation device 50 according to the present embodiment receives the cancellation notification of the first job, the navigation device 50 corrects some of the unprocessed tasks of the robot system (for example, the conveyance robot 31A, which is an automatic work robot of the first robot system) at the time of receiving the cancellation notification, and notifies the corrected unprocessed tasks to the first robot system. Therefore, even in the robot systems provided by different vendors, the unprocessed tasks of the other (second) robot system is corrected along with the cancellation, and are transmitted to the robot system before being executed. Accordingly, the work efficiency of the robot system can be improved.

When the navigation device 50 according to the present embodiment receives the cancellation notification of the first job, the navigation device 50 generates the recovery task for returning to the state before execution of the processed tasks of the robot system (for example, the picking robot 32A, 31A, which is an automatic work robot of the second robot system) different from the robot system (for example, the conveyance robot 31A, which is an automatic work robot of the first robot system) at the time of receiving the cancellation notification, and notifies the recovery task to the second robot system. Therefore, even if the robot systems are provided by different vendors, the state of the robot systems is returned to the state before the execution of the processed tasks of the other (second) robot system by the recovery task. As a result, the execution status of the robot systems is returned to the previous normal state, and it is possible to operate the production site F as much as possible without stagnating the production.

(Variations of Various Application Examples Relating to Handling of Conditional Task)

Next, with reference to FIGS. 13 to 16, an example of handling the conditional task by the navigation device 50 will be described with reference to a plurality of application examples (configuration examples). FIGS. 13, 14, 15, and 16 are diagrams schematically illustrating application examples of handling the conditional task by the navigation device 50.

Configuration Example 1

Figure 13:
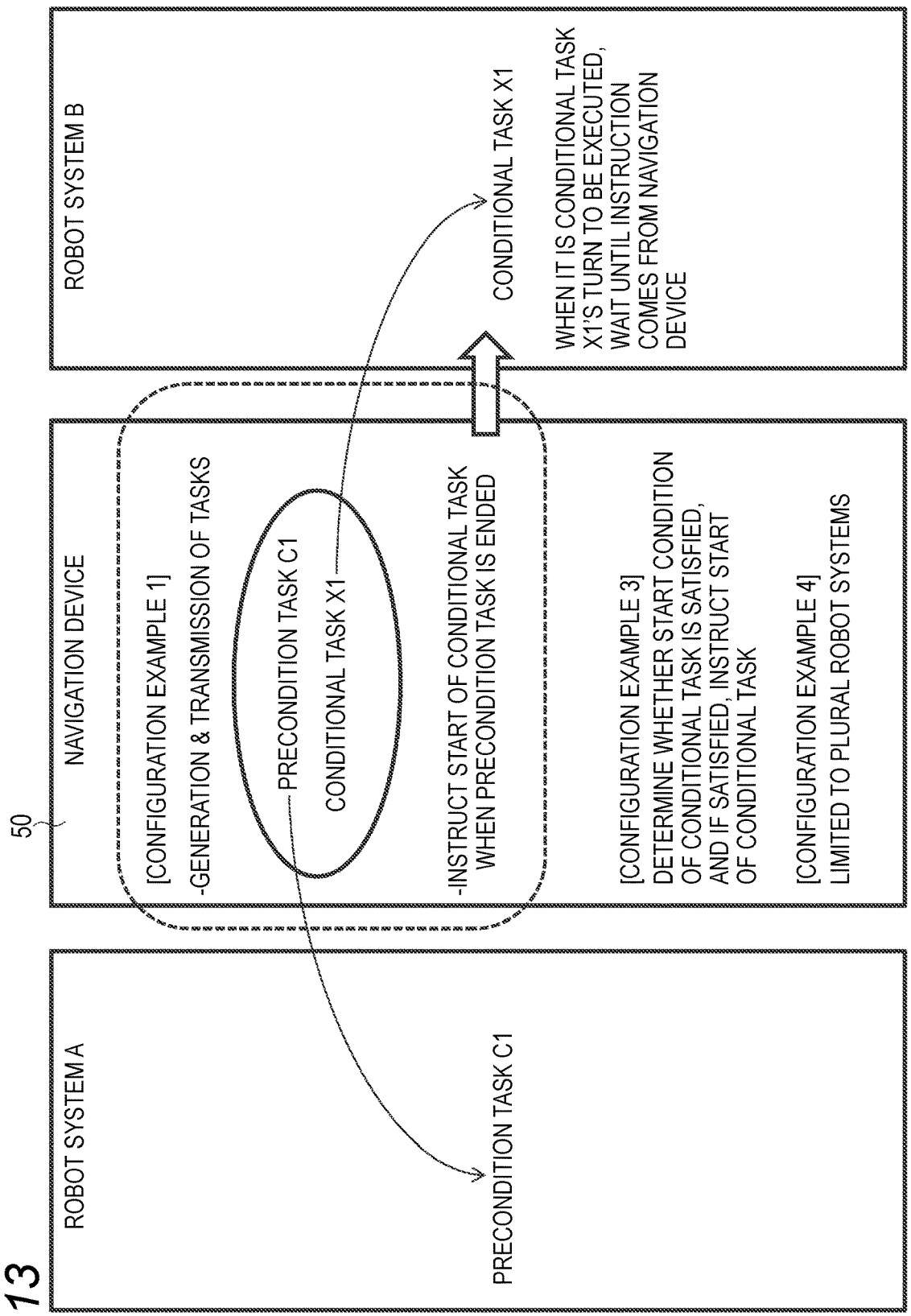
FIG. 13 is a diagram schematically illustrating an application example for handling a conditional task by a navigation device.

As illustrated in FIG. 13, the navigation device 50 generates, as tasks that are work commands to the robot system (see FIG. 2), at least one precondition task C1 and a conditional task X1, so as to send the generated tasks to the robot systems. FIG. 13 illustrates an example in which the precondition task C1 is sent to a robot system A and the conditional task X1 is transmitted to a robot system B, whereas both the precondition task C1 and the conditional task X1 may be sent to the same robot system (for example, the robot system B). In the description of FIGS. 13 to 16, each of the robot systems A, B, and D may be, for example, any one of the robot systems 31, 32, 33 illustrated in FIG. 2, or may be another robot system.

Here, the precondition task C1 is a task serving as a precondition for starting execution of the conditional task X1. The conditional task X1 is a task whose start condition is the end of the execution of the precondition task C1, and is, in principle, a task that cannot be started unless the precondition task C1 is executed. That is, the precondition task C1 and the conditional task X1 have a subordinate-superior relationship in which time periods for executing the tasks in time series are different. The navigation device 50 sends a start instruction of the conditional task X1 to the robot system B in a case where it is detected that the precondition task C1 is ended in the robot system A. In other words, the robot system B waits for execution of the conditional task X1 until the start instruction of the conditional task X1 is received from the navigation device 50.

As a result, the navigation device 50 can instruct the robot systems to execute the conditional task X1, which is not to be executed unless the precondition task C1 has been executed, and thus can effectively support continuous execution of the plurality of tasks in the robot systems.

Configuration Example 2

Figure 14:
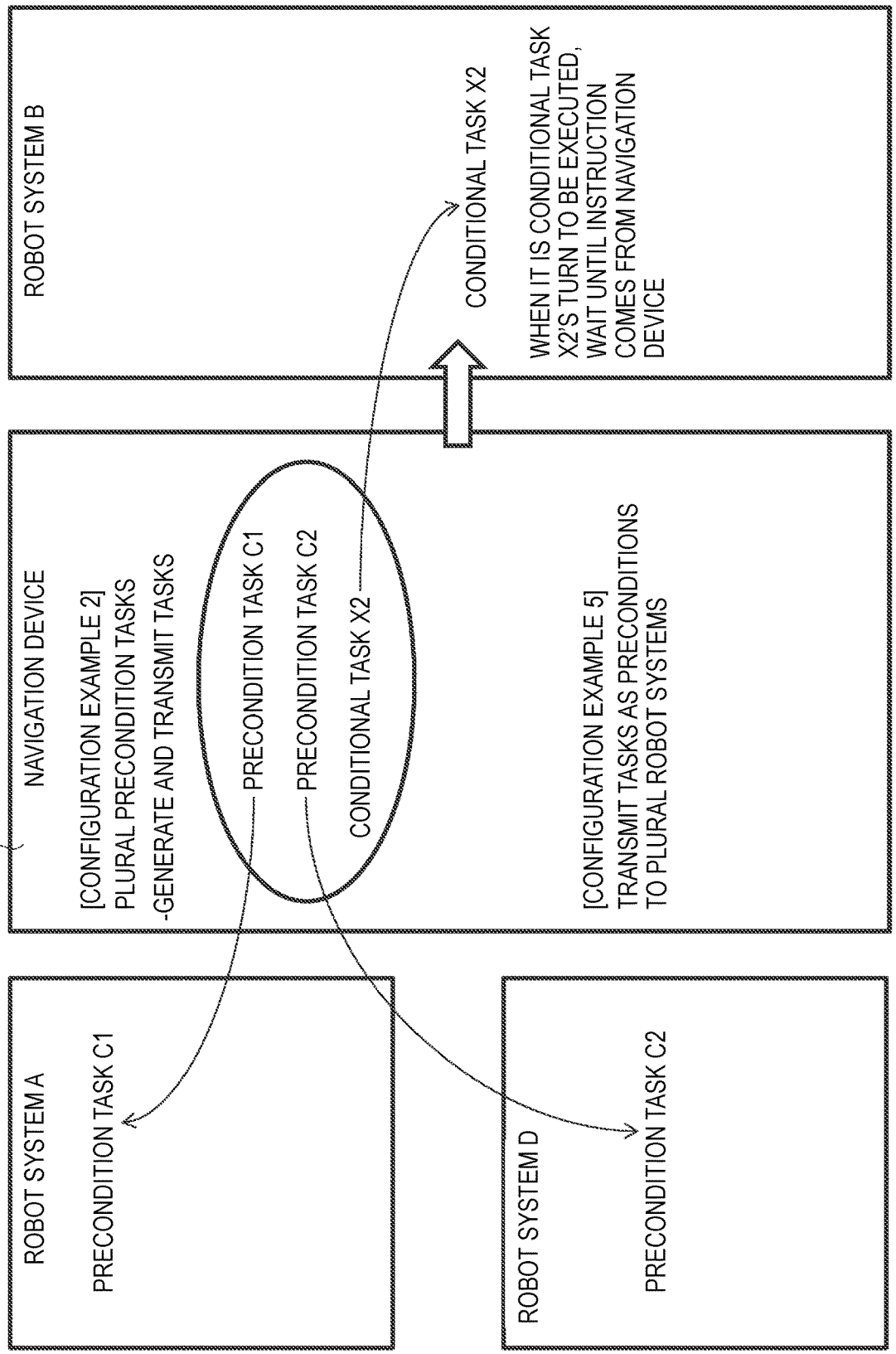
FIG. 14 is a diagram schematically illustrating an application example for handling a conditional task by the navigation device.

As illustrated in FIG. 14, the navigation device 50 may generate a plurality of precondition tasks C1 and C2, and may send the precondition task C1 to the robot system A and send the precondition task C2 to a robot system D. In addition, the navigation device 50 sends to the robot system B a conditional task X2 whose start condition is the end of execution of both the precondition tasks C1 and C2. FIG. 14 illustrates an example in which the precondition tasks C1, C2 are sent to the different robot systems A, D and the conditional task X2 is transmitted to the robot system B, whereas both the precondition tasks C1, C2 and the conditional task X2 may be sent to the same robot system (for example, the robot system B). The number of the plurality of precondition tasks may be three or more.

The navigation device 50 sends a start instruction of the conditional task X2 to the robot system B in a case where the precondition task C1 is ended in the robot system A and the precondition task C2 is ended in the robot system D. In other words, the robot system B waits for execution of the conditional task X2 until the start instruction of the conditional task X2 is received from the navigation device 50.

As a result, the navigation device 50 can instruct the robot systems to execute the conditional task X2, which is a delicate work that is not to be executed unless both the plurality of precondition tasks C1, C2 have been executed, and thus can effectively support continuous execution of the plurality of tasks in the robot systems.

Configuration Example 3

As illustrated in FIG. 13, the navigation device 50 determines whether the start condition of the conditional task X1 is satisfied, and in a case where it is determined that the start condition of the conditional task X1 is satisfied, sends the start instruction of the conditional task X1 to the robot system. The start condition of the conditional task X1 may include not only the precondition task C1 or the precondition tasks C1 and C2, but also a condition that a predetermined operation is executed in the robot system instructed to execute the conditional task X1.

Accordingly, for example, even when a new robot system is added to the integrated navigation system 1 and the robot system is caused to execute the precondition task, the navigation device 50 is only required to correct the start condition of the conditional task X1, and thus the versatility of the system is improved. In addition, the navigation device 50 does not start the execution of the conditional task X1 until the start condition is satisfied, and thus can execute the conditional task X1 at an accurate timing that is defined in advance.

Configuration Example 4

As shown in FIG. 13, the navigation device 50 sends the precondition task C1 to the first robot system (for example, the robot system A), and sends the conditional task X1 to the second robot system (for example, the robot system B). That is, a sending destination of the precondition task C1 and a sending destination of the conditional task X1 may be different from each other.

As a result, the navigation device 50 can instruct the robot system B to execute the conditional task X1, which is not to be executed unless the precondition task C1 has been executed in the different robot system A, and thus can cause the plurality of different robot systems to cooperate to effectively support continuous execution of the plurality of tasks.

Configuration Example 5

As illustrated in FIG. 14, the navigation device 50 sends the first precondition task (for example, the precondition task C1) to the first robot system (for example, the robot system A) different from the robot system B which executes the conditional task X2. The navigation device 50 sends the second precondition task (for example, the precondition task C2) to the second robot system (for example, the robot system D) different from the robot system B which executes the conditional task X2.

As a result, even in a case where each two among the robot systems that execute the plurality of precondition tasks and the robot system that executes the conditional task are different from each other, the navigation device 50 can cause the robot systems to cooperate according to the order in time series to effectively support continuous execution of the plurality of tasks.

Configuration Example 6

Figure 15:
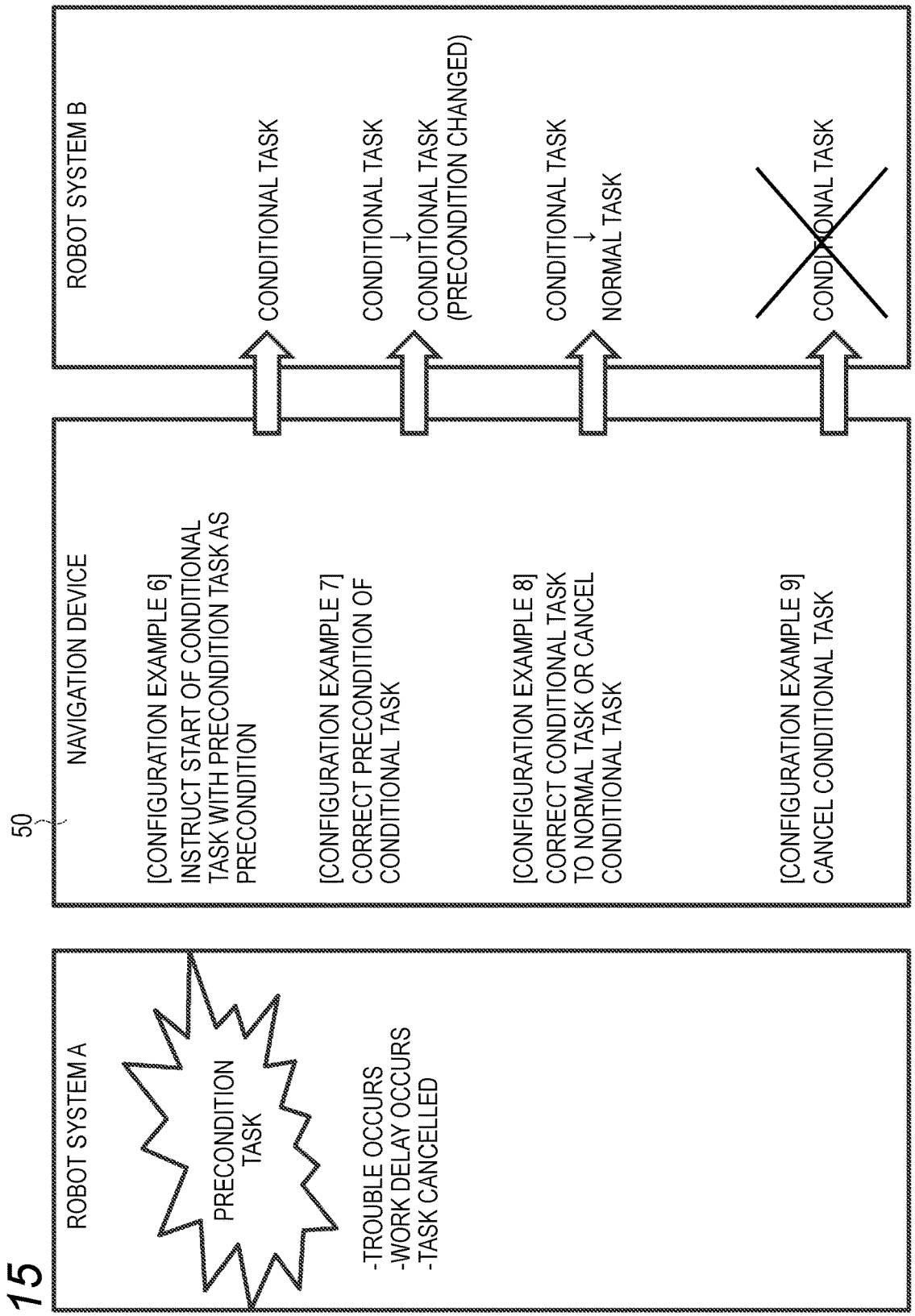
FIG. 15 is a diagram schematically illustrating an application example for handling a conditional task by the navigation device.

As illustrated in FIG. 15, in a case where the navigation device 50 receives a notification that the precondition task C1 cannot be executed from the first robot system (for example, the robot system A), the navigation device 50 sends the start instruction of the conditional task X1 to the second robot system (for example, the robot system B). When the robot system B receives the start instruction from the navigation device 50, the robot system B starts execution of the conditional task X1.

Accordingly, even in a case where a trouble occurs, a work delay occurs, or the precondition task C1 is cancelled in the robot system A, the navigation device 50 can prevent a situation in which the robot system B does not start the execution of the conditional task X1. Therefore, the navigation device 50 can start the execution of the conditional task X1 semi-forcibly, and thus can prevent deterioration of an overall work efficiency.

Configuration Example 7

As illustrated in FIG. 15, in a case where the navigation device 50 receives a notification that the precondition task C1 cannot be executed from the first robot system (for example, the robot system A), the navigation device 50 corrects the precondition (in other words, the start condition) of the conditional task X1, and sends the conditional task X1 whose start condition is corrected to the second robot system (for example, the robot system B). The robot system B receives and holds the conditional task X1 (that is, the conditional task X1 whose start condition is corrected) sent from the navigation device 50. The robot system B starts the execution of the conditional task X1 after receiving the execution instruction of the conditional task X1 whose start condition is corrected.

Accordingly, in a case where a trouble occurs, a work delay occurs, or the precondition task C1 is cancelled in the robot system A, the navigation device 50 can manage the execution of the conditional task X1 under the start condition while excluding the precondition task C1, and thus can control the execution of the conditional task X1 to be smoothly started.

Configuration Example 8

As shown in FIG. 15, in a case where the navigation device 50 receives a notification that the precondition task C1 cannot be executed from the first robot system (for example, the robot system A), the navigation device 50 corrects a type of the conditional task X1 to normal task (in other words, a task having no subordinate-superior relationship) and send the conditional task whose type is corrected to the second robot system (for example, the robot system B). The robot system B receives and holds the normal task sent from the navigation device 50. The robot system B starts the execution of the task after receiving an execution instruction of the normal task.

Accordingly, in a case where a trouble occurs, a work delay occurs, or the precondition task C1 is cancelled in the robot system A, the navigation device 50 can switch the conditional task X1 to the normal task while excluding the precondition task C1 (see the above description), thereby controlling the execution of the conditional task X1 to be smoothly started.

Configuration Example 9

As illustrated in FIG. 15, in a case where the navigation device 50 receives a notification that the precondition task C1 cannot be executed from the first robot system (for example, the robot system A), the navigation device 50 sends an execution cancel instruction of the conditional task X1 to the second robot system (for example, the robot system B).

Accordingly, in a case where a trouble occurs, a work delay occurs, or the precondition task C1 is cancelled in the robot system A, the navigation device 50 can neatly interrupt the execution of the conditional task X1 depending on the precondition task C1, and thus can block progress of the other tasks.

Configuration Example 10

Figure 16:
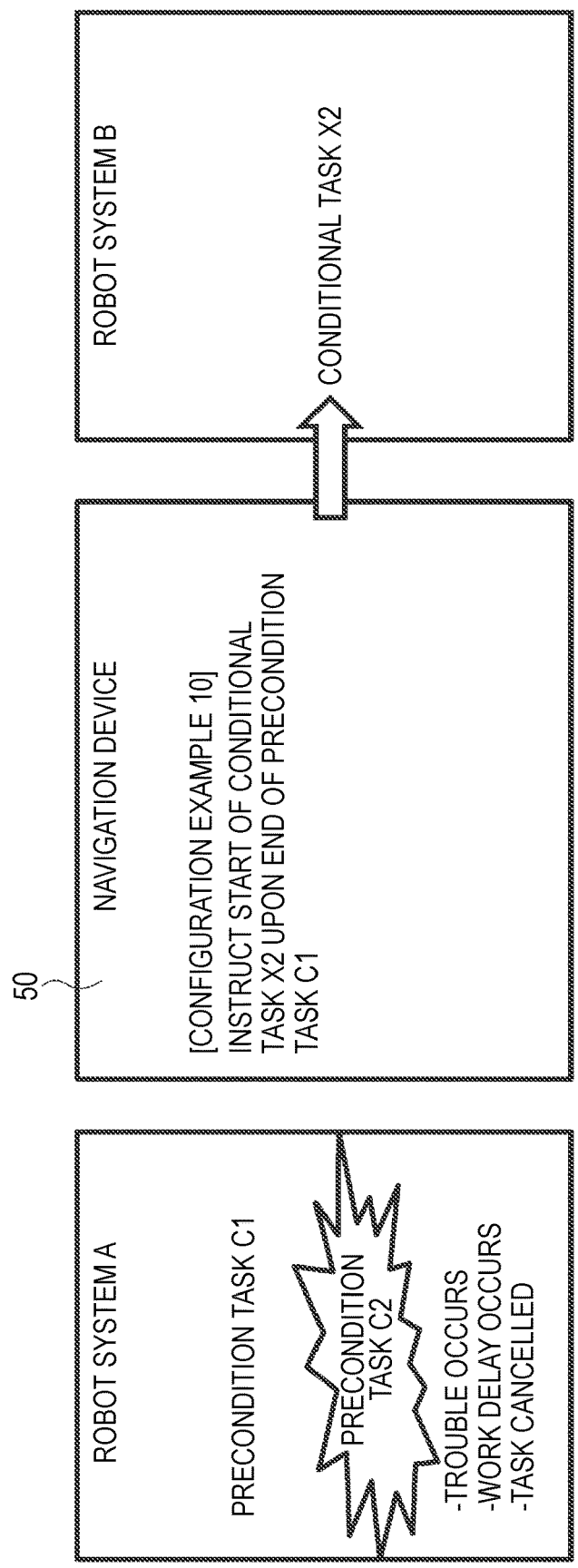
FIG. 16 is a diagram schematically illustrating an application example for handling a conditional task by the navigation device.

As shown in FIG. 16, in a case where the navigation device 50 receives a notification that some of the plurality of precondition tasks C1, C2 (for example, the precondition task C2) cannot be executed from the first robot system (for example, the robot system A), when the in a case where the navigation device determines that the remaining precondition tasks (for example, the precondition task C1) are ended, the navigation device 50 sends the start instruction of the conditional task X2 to the second robot system (for example, the robot system B).

Accordingly, in a case where a trouble occurs, a work delay occurs, or the precondition task C2 is cancelled in the robot system A, the navigation device 50 can execute the conditional task X2 while excluding the precondition task C2 as long as the remaining precondition task C1 can be executed, and thus can control the execution of the conditional task X2 to be smoothly started.

Configuration Example 11

The navigation device 50 generates identification information of the tasks in accordance with a predetermined rule, and generates the tasks including the identification information. In particular, it is preferable that the navigation device 50 generates an identification numbers of each task in a manner associated with an identification number of a job positioned superior to the task. Here, for example, as described above, the predetermined rule is a rule in which the child ID of each task for the automatic warehouses 33A is set in the 10 series, the child ID of each task for the conveyance robots 31A is set in the 30 series, and the child ID of each task for the picking robots 32A is set in the 50 series.

As a result, the navigation device 50 can generate the tasks including the identification numbers of the tasks, and thus can appropriately manage the tasks.

Configuration Example 12

The navigation device 50 generates the conditional task while including the identification information of the precondition task and the identification information of the conditional task in association with each other. That is, the conditional task is generated in a state of including in which not only the identification number of the conditional task but also the identification number of the precondition task.

As a result, since the identification information included in a data structure of the conditional task (not shown) includes the identification information of the precondition task, the navigation device 50 can appropriately manage whether the precondition task has ended before the start of the conditional task is instructed.

Although the embodiments have been described above with reference to the drawings, it is needless to say that the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Components in the above-described embodiment may be optionally combined within a range not departing from the spirit of the invention.

INDUSTRIAL APPLICABILITY

The present disclosure is useful as an integrated navigation system and a work instruction method that can effectively support sophisticated cooperation of operations between automatic work robots provided by a plurality of different vendors in a production site such as a factory and improve versatility and expandability as a system.

REFERENCE SIGNS LIST 1 integrated navigation system
2 stock shelf
3 waste collection device
4 consumable stock unit
5 member stock unit
10 production facility
11 board supply device
12 screen printing device
13 printing solder inspection device
14 component mounting device
14A component supply unit
15 component mounting state inspection device
16 reflow device
17 mounting board inspection device
18 mounting board collection device
20 production management device
21 change-over management unit
22 maintenance management unit
23 out-of-stock prediction unit
24 environment information storage unit
25 production plan storage unit
26 factory stock information storage unit
27 in-facility stock information storage unit
28 facility operation information storage unit
29 information management device
31 robot system
31A conveyance robot
31B conveyance robot management device
32 robot system
32A picking robot
32B picking robot management device
33 robot system
33A automatic warehouse
33B automatic warehouse management device
40 notification/monitoring device
41 worker terminal
50 navigation device
51 task management unit
52 task generation unit
53 interrupt processing unit
54 cancellation processing unit
55 task monitoring unit

What is claimed is:

1. An integrated navigation system configured to support cooperation of a plurality of different robot systems each including at least one automatic work robot operating at a production site, the integrated navigation system comprising:
   a job generator configured to generate a job related to production based on information sent from a plurality of production facilities deployed at the production site; and
   a task manager configured to generate a task, which is a work command to a first robot system and a second robot system cooperating to each other among the plurality of different robot systems, based on the job, and to send the task to each corresponding robot system,
   wherein
   the task manager is configured to:
      send, as the task, at least one precondition task to the first robot system, and send a conditional task to the second robot system, and
      send a start instruction of the conditional task to the second robot system in a case where the precondition task is ended, and
   the task manager is configured to, in a case where the task manager receives a notification that the precondition task cannot be executed from the first robot system, correct a type of the conditional task to normal task and send the conditional task whose type is corrected to the second robot system.

2. The integrated navigation system according to claim 1, wherein
   the task manager is configured to generate a plurality of precondition tasks.

3. The integrated navigation system according to claim 1, wherein
   the task manager is configured to:
      determine whether a start condition of the conditional task is satisfied, and in a case where it is determined that the start condition of the conditional task is satisfied, send the start instruction of the conditional task to the robot system.

4. The integrated navigation system according to claim 2, wherein
   the precondition task includes a first precondition task and a second precondition task,
   the task manager is configured to:
      send the first precondition task to the first robot system, and
      send the second precondition task to a third robot system different from the first robot system and the second robot system.

5. The integrated navigation system according to claim 1, wherein
   the task manager is configured to, in a case where the task manager receives a notification that the precondition task cannot be executed from the first robot system, send the start instruction of the conditional task to the second robot system.

6. The integrated navigation system according to claim 1, wherein
   the task manager is configured to, in a case where the task manager receives a notification that the precondition task cannot be executed from the first robot system, correct a start condition of the conditional task and send the conditional task whose start condition is corrected to the second robot system.

7. The integrated navigation system according to claim 1, wherein
   the task manager is configured to, in a case where the task manager receives a notification that the precondition task cannot be executed from the first robot system, send an execution cancel instruction of the conditional task to the second robot system.

8. The integrated navigation system according to claim 1, wherein
   the task manager is configured to, in a case where the task manager receives a notification that some of the plurality of precondition tasks cannot be executed from the first robot system, send the start instruction of the conditional task to the second robot system in a case that the task manager determines that remaining precondition tasks are ended.

9. The integrated navigation system according to claim 1, wherein
   the task manager is configured to generate the task including identification information of the task.

10. The integrated navigation system according to claim 9, wherein
the task manager is configured to generate the conditional task including identification information of the precondition task and identification information of the conditional task in association with each other.

11. The integrated navigation system according to claim 1, wherein
the task manager is configured to, in response to a receipt of a notification of a scheduled task time replied from the corresponding robot system in response to reception of the task for each of the robot systems, store the scheduled task time in a storage unit in association with identification information of the corresponding robot system.

12. The integrated navigation system according to claim 1, wherein
the task manager is configured to, in response to a receipt of an execution status notification sent from each of the robot systems and indicating the task is started, in execution, or ended, store an execution status of the task in a storage unit in association with identification information of the corresponding robot system.

13. The integrated navigation system according to claim 11, wherein
the task manager is configured to, in a case where the task manager does not receive a start notification of the task from any of the robot systems even after a predetermined time or more has elapsed from the scheduled task time corresponding to identification information of the robot system, send an abnormality notification including the task and a job corresponding to the task to a worker terminal.

14. The integrated navigation system according to claim 1, wherein
the task manager is configured to, in response to a receipt of an execution status notification indicating at least one task is ended in any one of the robot systems, send a start instruction of a conditional task based on the end of the at least one task to another robot system that executes the conditional task.

15. The integrated navigation system according to claim 1, wherein
the task manager is configured to, in response to a receipt of an error notification regarding a predetermined job from any one of the robot systems, generate an alternative task having the same content as the task sent to an error robot system that sent the error notification, and send the alternative task to another robot system that controls an automatic working robot of the same type as the error robot system.

16. The integrated navigation system according to claim 1, wherein
the task manager is configured to, in response to a receipt of an error notification regarding a predetermined job from any one of the robot systems, generate an alternative task for changing a movement destination of an automatic working robot corresponding to another robot system that is moving to an installation point of an automatic working robot corresponding to an error robot system that sent the error notification, and send the alternative task to the another robot system.

17. The integrated navigation system according to claim 16, wherein
the task manager is configured to, after the alternative task is sent to the another robot system, correct the conditional task based on the end of the alternative task, and send the corrected conditional task to a robot system that executes the conditional task.

18. The integrated navigation system according to claim 1, wherein
the task manager is configured to:
in a case that a second job to be executed earlier than a first job generated by the job generator is generated before start of the first job, generate a task based on the second job, and
send to the first robot system an integrated task in which a task of the first robot system based on the second job and a task of the first robot system based on the first job are combined so as to be executable in an order of the second job and the first job.

19. The integrated navigation system according to claim 1, wherein
the task manager is configured to:
in a case that a second job to be executed earlier than a first job generated by the job generator is generated before start of the first job, generate a task based on the second job, and
send to the first robot system a task of a first robot system based on the first job and a task of the first robot system based on the second job in a state that an execution order of the task of the first robot system and the task of the second robot system are exchanged.

20. The integrated navigation system according to claim 18, wherein
the task manager is configured to, in response to a receipt of a cancellation notification of the first job, delete an unprocessed task of the second robot system different from the first robot system at a time of receiving the cancellation notification, and notify a deletion notification of the unprocessed task to the second robot system.

21. The integrated navigation system according to claim 18, wherein
the task manager is configured to, in response to a receipt of a cancellation notification of the first job, correct some of unprocessed tasks of the first robot system at a time of receiving the cancellation notification, and notify the corrected unprocessed tasks to the first robot system.

22. The integrated navigation system according to claim 18, wherein
the task manager is configured to, in response to a receipt of a cancellation notification of the first job, generate a recovery task for returning to a state before execution of a processed task of the second robot system different from the first robot system at a time of receiving the cancellation notification, and notify the recovery task to the second robot system.

* * * * *